United States Patent
Kuhns

(10) Patent No.: US 12,525,103 B2
(45) Date of Patent: *Jan. 13, 2026

(54) SYSTEMS AND METHODS FOR REDUCING SEED THEFT IN PLANTING OPERATIONS

(71) Applicant: Philip Kuhns, Westmoreland, TN (US)

(72) Inventor: Philip Kuhns, Westmoreland, TN (US)

( * ) Notice: Subject to any disclaimer, the term of this patent is extended or adjusted under 35 U.S.C. 154(b) by 111 days.

This patent is subject to a terminal disclaimer.

(21) Appl. No.: 18/524,481

(22) Filed: Nov. 30, 2023

(65) Prior Publication Data

US 2024/0096184 A1    Mar. 21, 2024

Related U.S. Application Data

(63) Continuation-in-part of application No. 18/364,654, filed on Aug. 3, 2023, now Pat. No. 12,100,272, which is a continuation of application No. 17/374,622, filed on Jul. 13, 2021, now Pat. No. 11,756,396.

(51) Int. Cl.
*G08B 13/14* (2006.01)
*A01D 43/07* (2006.01)
*H04L 9/40* (2022.01)

(52) U.S. Cl.
CPC ......... *G08B 13/1472* (2013.01); *A01D 43/07* (2013.01); *H04L 63/0428* (2013.01)

(58) Field of Classification Search
CPC .. G08B 13/1472; A01D 43/07; H04L 63/0428
See application file for complete search history.

(56) References Cited

U.S. PATENT DOCUMENTS

| | | | |
|---|---|---|---|
| 7,047,103 B2* | 5/2006 | Hornbaker | G06K 19/04 700/225 |
| 8,634,765 B2 | 1/2014 | Plamondon | |
| 8,789,563 B2 | 7/2014 | Wenzel | |
| 9,119,342 B2* | 9/2015 | Bonefas | A01D 75/02 |

(Continued)

FOREIGN PATENT DOCUMENTS

| | | |
|---|---|---|
| JP | 2006061104 A | 3/2006 |
| JP | 2019121116 A | 7/2019 |

OTHER PUBLICATIONS

Eurasian Search Report completed Jan. 12, 2023 for Eurasian Application No. 202291805, 3 pages.

*Primary Examiner* — Hoi C Lau
(74) *Attorney, Agent, or Firm* — Dickinson Wright PLLC

(57) ABSTRACT

A method for transferring seed during a planting operation includes receiving, by a theft detection system, a first equipment identity of first equipment, receiving the seed into a seed bin of second equipment from the first equipment, determining, using a sensing device disposed on the second equipment and communicatively coupled to the theft detection system, a first weight value indicative of weight of the seed received into the seed bin from the first equipment, and at least one of transmitting, by the theft detection system using a satellite data communication protocol, the first weight value and the first equipment identity to a tracking system, and determining, by the theft detection system, whether any of the seed was stolen based on the first weight value and the first equipment identity and selectively generating and transmitting a notification to the tracking system indicating that the seed was stolen.

22 Claims, 13 Drawing Sheets

(56) References Cited

U.S. PATENT DOCUMENTS

| | | |
|---|---|---|
| 9,128,867 B2 | 9/2015 | Cawse et al. |
| 9,268,911 B2 | 2/2016 | Sia et al. |
| 9,529,364 B2 * | 12/2016 | Foster .................. A01B 69/004 |
| 9,820,436 B2 * | 11/2017 | Inoue ................. A01D 41/1274 |
| 10,143,132 B2 * | 12/2018 | Inoue ................. A01D 41/1272 |
| 10,234,562 B2 | 3/2019 | Janky et al. |
| 10,278,328 B2 * | 5/2019 | Thomson ........... A01D 41/1217 |
| 10,945,367 B2 * | 3/2021 | Inoue ................. A01D 41/1208 |
| 11,188,098 B2 * | 11/2021 | Desai ................... G05D 1/0291 |
| 11,315,052 B2 * | 4/2022 | Chanasyk ........ G06Q 10/06313 |
| 11,372,402 B2 * | 6/2022 | Desai ................... B60W 10/20 |
| 11,756,396 B2 * | 9/2023 | Kuhns ................ H04W 12/033 |
| | | 340/568.1 |
| 12,100,272 B2 * | 9/2024 | Kuhns ................ G08B 13/1472 |
| 2003/0182259 A1 | 9/2003 | Pickett et al. |
| 2006/0169776 A1 * | 8/2006 | Hornbaker ............. G06K 19/04 |
| | | 340/572.1 |
| 2008/0077320 A1 | 3/2008 | Loftus et al. |
| 2008/0278314 A1 | 11/2008 | Miller et al. |
| 2011/0092158 A1 | 4/2011 | Plamondon |
| 2012/0200697 A1 * | 8/2012 | Wuestefeld .............. H04N 7/18 |
| | | 198/810.01 |
| 2014/0311113 A1 * | 10/2014 | Bonefas ................. A01D 75/02 |
| | | 56/10.2 R |
| 2014/0333453 A1 | 11/2014 | Sia et al. |
| 2014/0372166 A1 * | 12/2014 | Chanasyk ........ G06Q 10/06313 |
| | | 705/7.23 |
| 2015/0205308 A1 | 7/2015 | Huat |
| 2015/0264866 A1 * | 9/2015 | Foster .................... B65G 67/24 |
| | | 414/21 |
| 2017/0031840 A1 | 2/2017 | Cawse et al. |
| 2017/0075354 A1 | 3/2017 | Putkonen et al. |
| 2018/0242521 A1 * | 8/2018 | Thomson ............... B65G 65/34 |
| 2019/0095358 A9 | 3/2019 | Cawse et al. |
| 2019/0361148 A1 | 11/2019 | Ulmer et al. |
| 2020/0319632 A1 * | 10/2020 | Desai ........................ B60P 1/00 |
| 2020/0319655 A1 * | 10/2020 | Desai ................... A01B 69/008 |
| 2020/0349789 A1 * | 11/2020 | Kim ..................... H04W 12/63 |
| 2021/0078853 A1 * | 3/2021 | Long ..................... B67D 7/145 |
| 2022/0156670 A1 * | 5/2022 | Issrani ................. B62B 5/0096 |
| 2022/0228902 A1 * | 7/2022 | Von Muenster ..... G01G 15/006 |
| 2022/0228906 A1 * | 7/2022 | Von Muenster ....... G01G 23/14 |
| 2022/0272960 A1 * | 9/2022 | Long ..................... A01M 7/0089 |
| 2023/0018114 A1 * | 1/2023 | Kuhns ................... A01D 43/07 |
| 2023/0030848 A1 * | 2/2023 | Buckland ............. A01B 69/008 |
| 2023/0072664 A1 * | 3/2023 | Walker ................. A01F 12/181 |
| 2023/0108200 A1 * | 4/2023 | Von Muenster ....... G01G 19/08 |
| | | 177/1 |
| 2023/0377432 A1 * | 11/2023 | Kuhns ................ H04W 12/009 |
| 2024/0096184 A1 * | 3/2024 | Kuhns ................ G08B 13/1472 |
| 2024/0265791 A1 * | 8/2024 | Kuhns ................... A01D 43/07 |

* cited by examiner

SYSTEMS AND METHODS FOR REDUCING SEED THEFT IN PLANTING OPERATIONS

CROSS-REFERENCE TO RELATED APPLICATIONS

The present disclosure is a continuation-in-part of U.S. patent application Ser. No. 18/364,654, filed Aug. 3, 2023, which is a continuation application of U.S. patent application Ser. No. 17/374,622, filed on Jul. 13, 2021 (now U.S. Pat. No. 11,756,396). The entire disclosures of the applications referenced above are incorporated herein by reference.

BACKGROUND

Harvesting operations generally require multiple vehicles. In an exemplary process, a harvesting machine cuts a crop and stores the crop in a bin. Then, a cart moves alongside the harvesting machine while the harvesting machine empties the crop into the cart. After that, the cart empties the crop into a trailer, and the trailer is subsequently hauled to a storage facility such as an elevator or a silo. Similarly, planting and growing operations may require multiple vehicles. For example, a planting operation may include transferring seed from a trailer or container to a seed tender and from the seed tender to a planter, or directly from the trailer or other container to the planter.

While several advances in the vehicles can lead to a more efficient harvesting, planting, and other operations, there are some drawbacks. For example, the "chain of custody" of the crop (e.g., grain) or seed from machine to machine is susceptible to theft, as each transfer of the crop or seed from one machine to another gives various persons—machine operators, farm workers, or other nefarious actors—an opportunity to steal the crop or seed. As the crop or seed is transferred from one machine to another, it is difficult to visually determine whether any crop or seed is stolen. For example, most crop recording nay be performed manually near the end stage of the crop transfer process, i.e., at the storage facility. Accordingly, when the crop is stolen at an earlier stage, it is difficult to tell at which stage(s) it was stolen, and who is responsible party/parties for stealing the crop. Similar problems exist for seed, fertilizer, and other agricultural materials.

SUMMARY

A method for transferring seed from first equipment to second equipment during a planting operation includes receiving, by a theft detection system, a first equipment identity of the first equipment, receiving the seed into a seed bin of the second equipment from the first equipment, determining, using a sensing device disposed on the second equipment and communicatively coupled to the theft detection system, a first weight value indicative of weight of the seed received into the seed bin from the first equipment, and at least one of transmitting, by the theft detection system using a satellite data communication protocol, the first weight value and the first equipment identity to a tracking system remotely located from the second equipment, and determining, by the theft detection system, whether any of the seed was stolen based on the first weight value and the first equipment identity and selectively generating and transmitting a notification to the tracking system indicating that the seed was stolen.

Other embodiments include a non-transitory computer readable storage medium configured to store instructions that, when executed by a processor included in a computing device, cause the computing device to carry out the various steps of any of the foregoing methods. Further embodiments include systems configured to carry out the various steps of any of the foregoing methods and or one or more processors or processing devices configured to carry out the various steps of any of the foregoing methods.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

For a detailed description of example embodiments, reference will now be made to the accompanying drawings in which.

DEFINITIONS

Figure 1A:
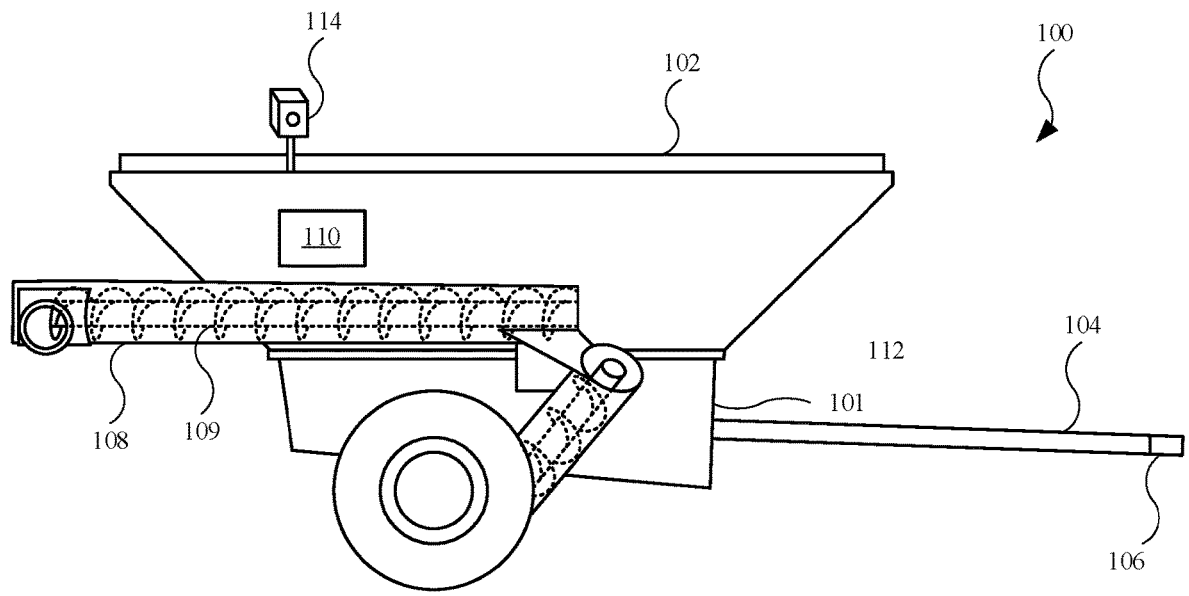
FIGS. 1A and 1B show an embodiment of a grain cart.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

In relation to electrical devices (whether stand alone or as part of an integrated circuit), the terms "input" and "output" refer to electrical connections to the electrical devices, and shall not be read as verbs requiring action. For example, a differential amplifier (such as an operational amplifier) may have a first differential input and a second differential input, and these "inputs" define electrical connections to the operational amplifier, and shall not be read to require inputting signals to the operational amplifier.

"Assert" shall mean changing the state of a Boolean signal. Boolean signals may be asserted high or with a higher voltage, and Boolean signals may be asserted low or with a lower voltage, at the discretion of the circuit designer. Similarly, "de-assert" shall mean changing the state of the Boolean signal to a voltage level opposite the asserted state.

"Controller" shall mean, alone or in combination, individual circuit components, an application specific integrated circuit (ASIC), a microcontroller with controlling software, a reduced-instruction-set computing (RISC), a digital signal processor (DSP), process with controlling software, a processor with controlling software, a programmable logic device (PLD), or a field programmable gate array (FPGA), configured to read inputs and drive outputs responsive to the inputs.

"Short-range wireless communication protocol" shall mean a wireless communication protocol in which two device directly communicate with each other wirelessly over a distance of 500 meters or less. For example, Wi-Fi, Bluetooth, Zigbee, Z-Wave, as well as certain radio frequency identification (RFID) tags and associated readers. Data communications over a cellular network shall not be considered a short-range wireless communication protocol.

"Short-range data communication module" shall mean electronic hardware devices designed and constructed to communicate using the short-range wireless data communication protocol.

"Satellite data communication protocol" shall mean a wireless communication protocol in which a land-based device directly communicates with a satellite orbiting the Earth, and the satellite relays the data to and from a remote location.

"Satellite data communication module" shall mean electronic hardware devices designed and constructed to communicate using the satellite data communication protocol.

"A", "an", and "the" as used herein refers to both singular and plural referents unless the context clearly dictates otherwise. By way of example, "a processor" programmed to perform various functions may refer to one processor programmed to perform each and every function, or more than one processor collectively programmed to perform each of the various functions, or more than one processor each programmed to perform each and every function.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present disclosure is directed to a grain cart with a theft detection system designed to prevent unwanted grain theft during a harvesting operation. As grain is harvested and transported between different machinery, each transportation event is susceptible to grain being stolen by any number of persons. To prevent this, the theft detection system includes hardware and communication components mounted to the grain cart. When mounted to a grain cart, the theft detection system may include a sensing device designed to determine a weight value, or amount, of grain during an onboarding event (i.e., when the grain cart receives grain from a harvesting machine) and send the weight value information to a remote tracking system, where the weight value information can be stored or analyzed. Additionally, the theft detection system can use the sensing device to determine a weight value of grain in the grain cart during an offloading event (i.e., when the grain cart transfers grain to a trailer) and send the weight value information to the remote tracking system.

In some examples, the grain cart includes a camera system used to identify respective indicia, or markings, on both the harvesting machine and the trailer. In this manner, the theft detection system not only tracks the amount of grain during onboarding and offloading events, but also tracks the identity of the machinery used during the onboarding and offloading events. The theft detection system can send the identification information along with the weight value information to the remote tracking system, thereby allowing the remote tracking system to store weight value and the particular machine associated with the stored weight values.

It may be desirable limit or prevent persons from learning the weight values and associated machine identities, thus reducing the likelihood of those persons exploiting this information to steal the grain. In this regard, in some exemplary embodiments, the theft detection system includes an encryption module that encrypts the information or data associated with the weight value and machine identity prior to sending the information to the remote tracking system. As a result, the machine operators or any other unknown persons cannot access, without the proper key, the weight value and machine identity information of grain collected and transported during the harvesting operation.

Additionally, the communication systems described herein may include wireless communication. Moreover, some communications system include satellite data communication (e.g., Global Position System, or GPS, and Iridium Satellite Communications system). By providing satellite communication via a satellite data communication module, the theft detection system offers several advantages over cellular network communication. For example, the satellite communication is virtually available worldwide, whereas cellular networks are available in some regions but not others. Moreover, in regions where cellular network communication is available, the cellular network communication tends to be good in some locations but poor in other locations. Also, satellite data communication is particularly advantageous in rural areas commonly associated with farmland, as farmland tends to be relatively further from cellular network base stations as compared urban areas and other high-density population areas. Accordingly, users of the theft detection system described herein do not need to rely on less reliable communication protocols, such as cellular network communication.

This detailed description refers to harvesting operations for grain, and accordingly, grain may come from various planted crops such as wheat, oats, rice, corn, sorghum, millet, rye, and barley, as non-limiting examples. However it should be noted in some examples, other harvestable crops may substitute for grain. As a result, this theft detection system may additionally apply to other harvested crops not specially discussed in this detailed description.

In some examples, the principles of the present disclosure may be implemented for other types of agricultural operations, including, but not limited to, seed planting operations (e.g., planting of granular seed), fertilizing operations (e.g., application of granular (dry) and/or liquid fertilizer), other chemical application operations (e.g., application of granular or liquid pesticides, herbicides, etc.). For example, instead of (or in addition to) preventing, detecting, and/or tracking theft of grain during harvesting, systems and methods of the present disclosure may be further configured to prevent, detect, and/or track theft of seed and other materials applied during planting and growing operations as described herein in more detail. In still other examples, the principles of the present disclosure may be implemented for tracking fuel extraction/transfer to/from agricultural machinery, fuel usage/consumption by the agricultural machinery, etc.

Figure 1B:
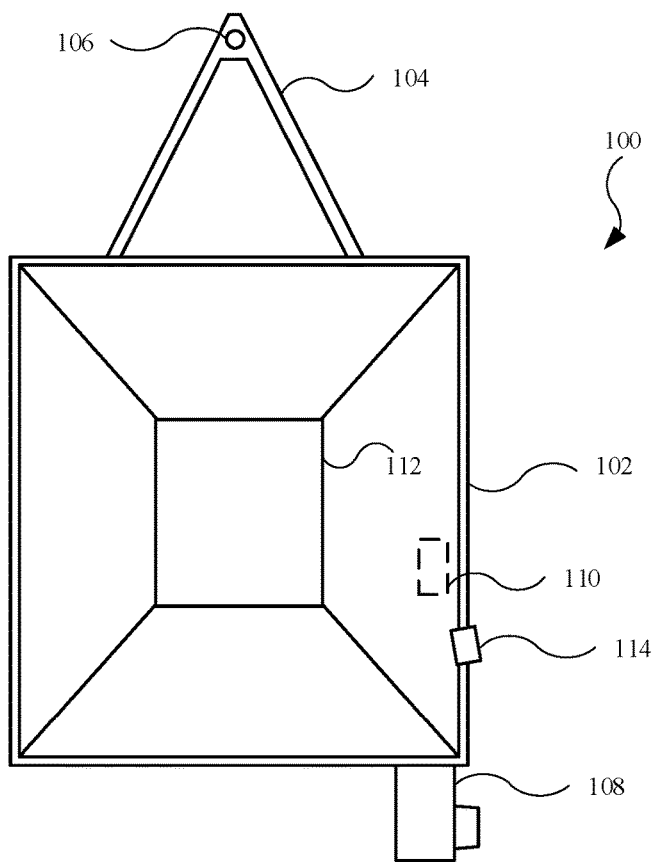

FIGS. 1A and 1B show an embodiment of a grain cart 100. The grain cart 100 is used to transport and temporarily store grain during a harvesting operation. As shown, the grain cart 100 includes a frame 101 and a grain bin 102 positioned on the frame 101. The grain bin 102 defines a volume for storing the grain. The grain cart 100 further includes a tongue or post 104 and a coupling unit 106 (located on the post 104) used to attach to a motorized vehicle (not shown in FIGS. 1A and 1B) that pulls the grain cart 100. Subsequent to receiving grain in the grain bin 102, the grain cart 100 is designed to offload the grain onto, for example, a trailer (shown later). In this regard, the grain cart 100 includes a tube 108 and an auger 109 (shown as dotted lines). While the tube 108 and the auger 109 are shown in a stored position, the tube 108 and the auger 109 can transition to a deployed position to offload grain from the grain bin 102 to the trailer. Although not shown, the grain cart 100 includes a motor used to rotationally drive the auger 109, such as a hydraulic motor driven by hydraulic fluid provided from the motorized vehicle.

In order to monitor grain, the grain cart 100 includes a theft detection system 110. The theft detection system 110 is designed to track grain, including the weight value or amount, onboarded into the grain bin 102. The "weight value" may refer to a numerical value associated with the weight measured in pounds or kilograms, as examples. Additionally, the theft detection system 110 can track grain, including the weight value offloaded from the grain bin 102 via the tube 108 and the auger 109. While the theft detection system 110 is shown as mounted to a particular location of the grain bin 102, the theft detection system 110 can be mounted to other locations of the grain bin 102 and the grain cart 100.

To determine the weight value, the theft detection system 110 may include a sensing device 112 in operational relationship with the grain bin 102. As shown in FIG. 1A, the grain gin 102 is positioned on the sensing device 112. When grain is disposed in the grain bin 102, the sensing device 112 can determine a weight value the grain bin 102. By subtracting a known weight value of the grain bin 102, the sensing device 112 can determine the weight value of the grain when the grain is loaded into the grain bin 102. As shown in FIG. 1B, the sensing device 112 is located in the grain bin 102. In some embodiments, the sensing device 112 includes a weight management system, such as a scale. However, the sensing device 112 may take other forms, which will be shown and described below.

The theft detection system 110 may include several communication modules used to receive and transmit information. For example, the theft detection system 110 may include a satellite data communication module used to transmit information or data associated with the weight value (provided by the sensing device 112) to a tracking system remotely located with respect to the grain cart 100. Additionally, the theft detection system 110 may include a short-range wireless communication module used to send information to, and/or receive information from, other machinery (shown and discussed below) used in the harvesting operation.

In some embodiments, the grain cart 100 includes a camera system 114 used to read identifying indicia from machinery used in the harvesting operation. Each indicia on the machinery can be specific to that particular machinery. Accordingly, the theft detection system 110 can determine which machines provide grain to the grain bin 102, and which machines receive grain from the grain bin 102. In addition to the weight value, the identified indicia can also be transmitted to the tracking system using the satellite data communication module. Also, prior to transmitting to the tracking system, the theft detection system 110 may include an encryption module used to encrypt the information or data related to the weight value and the identified indicia. These features will be shown and described in further detail below.

Figure 2:
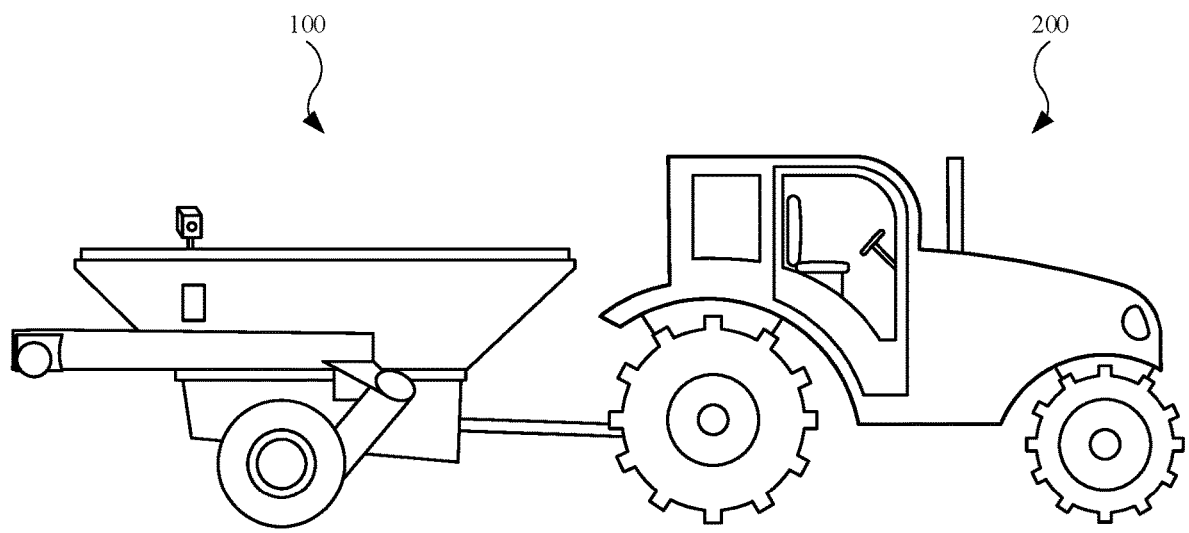
FIG. 2 shows an embodiment of a tractor used to haul the grain cart.

FIG. 2 shows an embodiment of a tractor 200 used to haul the grain cart 100. When connected to the grain cart 100, the tractor 200 can pull the grain cart 100 alongside a harvesting machine (not shown in FIG. 2). The tractor 200 is an exemplary machine, and other motorized vehicles can be used to haul the grain cart 100.

Figure 3A:
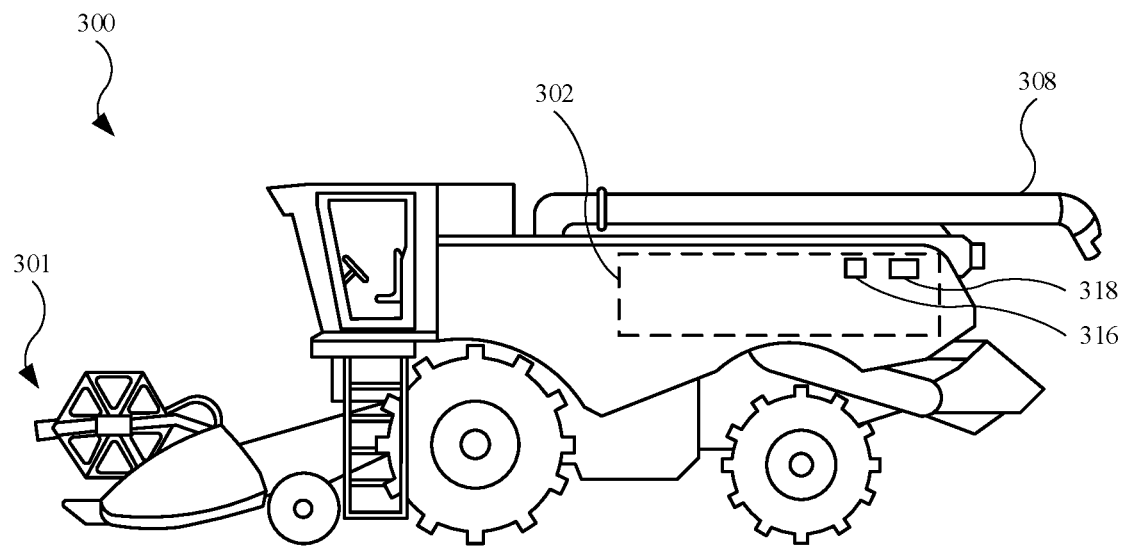
FIGS. 3A and 3B show an embodiment of a harvesting machine.
Figure 3B:
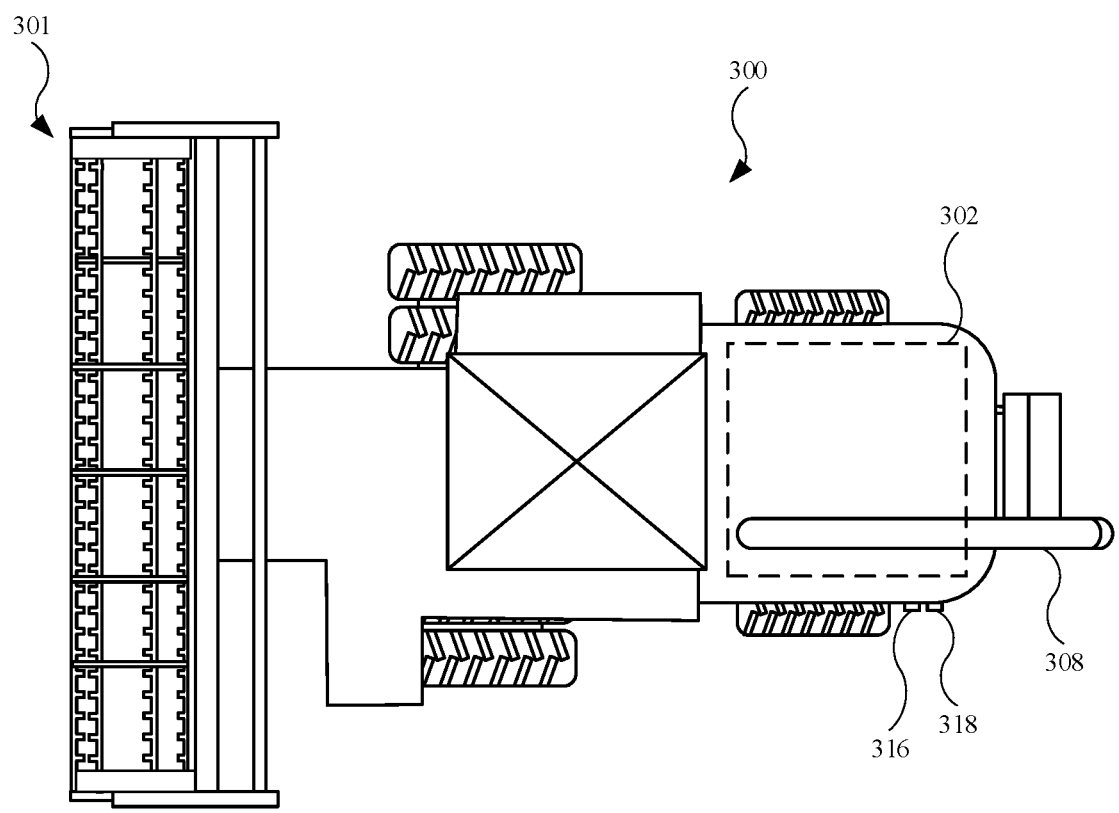

FIGS. 3A and 3B show an embodiment of a harvesting machine 300. The harvesting machine 300 can be referred to as a combine. The harvesting machine 300 is designed to retrieve, cut, and sort grain from the harvested crop. As shown, the harvesting machine 300 includes a head 301 having various parts (not labeled), such as a reel and a cutter bar. The head 301 may include a detachable head. In this manner, the head 301 can be substituted with one or more different heads having different sizes and different components based on the type of grain. The harvesting machine 300 further includes a grain bin 302 used as a volume to store grain. Although not shown, the harvesting machine 300 may include a conveyor belt used to transport the grain from the head 301 to the grain bin 302. In order to remove the grain from the grain bin 302, the harvesting machine includes a tube 308 and an auger (not shown in FIGS. 3A and 3B) used to extract the grain from the grain bin 302 to, for example, a grain bin (e.g., grain bin 102 shown in FIG. 1A). Additionally, in some embodiments, the harvesting machine 300 includes an indicium 316 used to identify the harvesting machine 300. In this regard, the indicium 316 may be unique to the harvesting machine 300 such that the harvesting machine 300 can be distinguished from other harvesting machines. Referring to the grain cart 100 in FIGS. 1A and 1B, the camera system 114 can read an indicium (such as the indicium 316) and provide, to the theft detection system 110, information related to the indicium. Additionally, in some embodiments, the harvesting machine 300 includes a communication module 318 used to receive and/or transmit short-range wireless communication. Referring again to the grain cart 100 in FIGS. 1A and 1B, the theft detection system 110, also having communication capabilities, can retrieve information from the communication module 318, such as a weight value of grain in the grain bin 302 (as determined by the harvesting machine 300 prior to an onboarding event), authentication information used to verify the harvesting machine 300 (including an expected harvesting machine during a harvesting operation), a time stamp associated with initiation of onboarding event, and/or a time duration associated with the time taken for the onboarding event.

Figure 4:
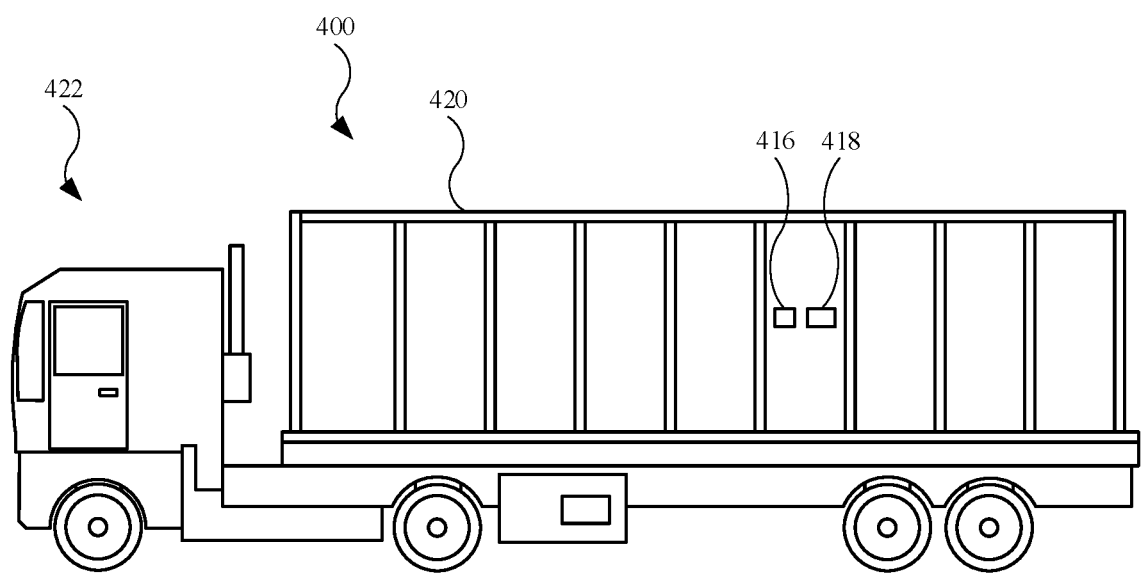
FIG. 4 shows an embodiment of a trailer.

FIG. 4 shows an embodiment of a trailer 400. The trailer 400 can be used as an offload container for offloading grain from a grain cart. As shown, the trailer 400 includes a container 420 used as a volume to store the grain. Also, the trailer 400 is connected to a semi-truck 422 used to haul the trailer 400. In an example harvesting operation, the trailer 400 cam remain stationary until a grain cart and tractor (not shown in FIG. 4) arrive alongside the trailer 400. Subsequent to an offloading event of grain into the trailer 400, the semi-truck 422 can haul the trailer 400 (filled with grain) to a storage facility. The semi-truck 422 is an exemplary machine, and other motorized vehicles can be used to haul the trailer 400.

In some embodiments, the trailer 400 includes an indicium 416 used to identify the trailer 400. In this regard, the indicium 416 may be unique to the trailer 400 such that the trailer 400 can be distinguished from other trailers. Referring to the grain cart 100 in FIGS. 1A and 1B, the camera system 114 can read an indicium (such as the indicium 416) and provide, to the theft detection system 110, information related to the indicium. Additionally, in some embodiments, the trailer 400 includes a communication module 418 used to receive and/or transmit short-range wireless communication. Referring again to the grain cart 100 in FIGS. 1A and 1B, the theft detection system 110, also having communication capabilities, can retrieve information from the communication module 418, such as a weight value of grain in the container 420 subsequent to an offloading event, authentication information used to verify the trailer 400, a time stamp associated with offloading event, and/or a time duration associated with offloading event.

Figure 5:
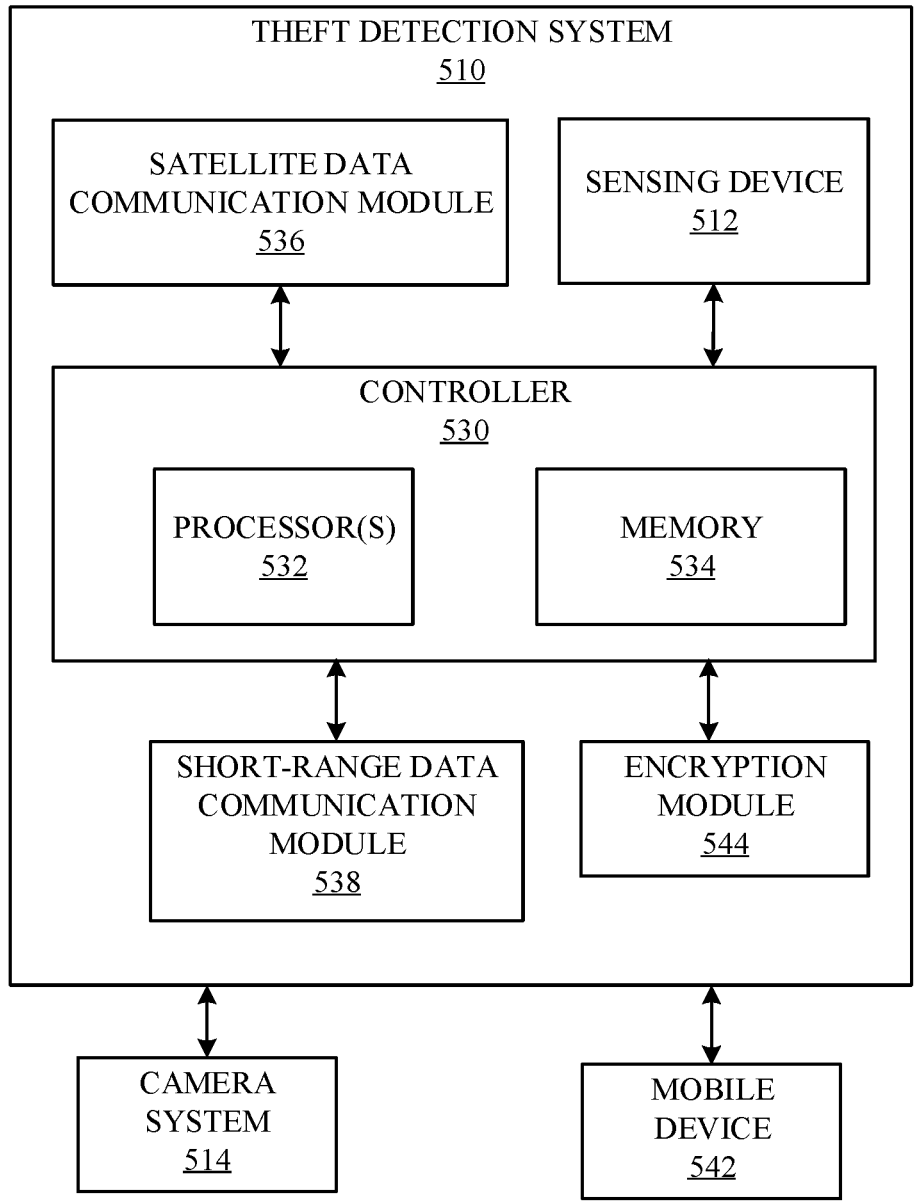
FIG. 5 shows a schematic diagram of a theft detection system, in accordance with some described embodiments.

FIG. 5 shows a schematic diagram of a theft detection system 510, in accordance with some described embodiments. Other theft detection systems (e.g., the theft detection system 110, shown in FIGS. 1A and 1B) may include any features described herein for the theft detection system 510. The theft detection system 510 can be mounted to farm equipment, such as grain carts (e.g., the grain cart 100) described herein.

The theft detection system 510 may include a controller 530 used to receive communication from input devices and use the communication to output controls or commands to other devices. The controller 530 may include a programmable logic controller or one or more microcontrollers, as non-limiting examples. The controller 530 may include one or more processors 532 and memory 534. When the controller 530 is implemented as a processor 532 and memory 534, the one or more processors 532 are designed to execute instructions or algorithms stored on the memory 534, which may include random access memory or read-only memory. While components of the theft detection system 510 are shown within a same schematic representation of the theft detection system 510, one or more of the components may be located at various locations remote from one another (e.g., in different locations of the grain cart 100). Further, although shown separate from the theft detection system 510, the camera system 514 (and/or other components, such as the mobile device 542) may be characterized, in some examples, as components of the theft detection system 510.

The theft detection system 510 may further include a sensing device 512 operatively coupled to the controller 530. The sensing device 512 is designed to determine a weight value (i.e., amount of grain) in a grain bin of the grain cart. In this regard, the sensing device 512 can determine a weight value of the grain during an onboarding event, and provide the weight value information to the controller 530. Accordingly, based on the determined weight value by the sensing device 512, the theft detection system 510 can determine the weight value of the grain to be provided from the grain cart to the trailer during an offloading event. Several exemplary embodiments of the sensing device are shown and described below.

The theft detection system 510 may further include a satellite data communication module 536 operatively coupled to the controller 530. The satellite data communication module 536 may rely upon satellite data communication protocol, such as the Iridium Satellite Communications system, to transmit information. When directed by the controller 530, the satellite data communication module 536 is designed to transmit information to a tracking system (e.g., a server, including cloud-based server, a database, or a computing system). The satellite data communication module 536 can provide the weight value information of grain, as determined by the sensing device 512, to the tracking system. Additionally, the satellite data communication module 536 can also provide indicia information of machinery (e.g., harvesting machine and/or trailer), as determined by a camera system 514 communicatively coupled to the controller 530.

The theft detection system 510 may further include a short-range data communication module 538. The short-range data communication module 538 communicates over short-range communication protocols, such as BLUETOOTH® or WIFI®, as non-limiting examples. The short-range data communication module 538 is designed to communicate with communication modules (e.g., communication module 318 of the harvesting machine 300 in FIGS. 3A and 3B, and communication module 418 of the trailer 400 in FIG. 4). As non-limiting examples, the received communication may include identifying indicia of the harvesting machine, a weight value of grain in a grain bin of a harvesting machine prior to an onboarding event, identifying indicia of a trailer, a weight value of grain in grain bin of a trailer subsequent to an offloading event, a time stamp associated with initiation of the onboarding or offboarding events, and/or a time duration associated with the onboarding or offboarding events.

Alternatively, or in combination, the short-range data communication module 538 can determine identifying information of the harvesting machine and/or the trailer by communicating with mobile devices, including mobile wireless communication devices (e.g., smartphones) that also include short-range wireless communication modules operating over short-range communication protocols. For example, when an operator (i.e., driver) of a harvesting machine carries a mobile device 542, the mobile device 542 can store identification information that is unique to the harvesting machine. The theft detection system 510 can use the short-range data communication module 538 to communicate with the mobile device 542 and receive the unique identification information. While an example for an operator of a harvesting machine is given, an operator of a semi-truck hauling the trailer may also carry a mobile device similar to the mobile device 542, and accordingly, the short-range data communication module 538 can receive identification information from the operator of the semi-truck hauling the trailer that is unique to the trailer.

In order to prevent persons (including vehicle operators of the harvesting machines, farmhand/laborers, and/or the nefarious actors) from gaining knowledge of the weight values of the grain, the theft detection system 510 may further include an encryption module 544 operatively coupled to the controller 530. Prior to the satellite data communication module 536 providing information to the tracking system, the encryption module 544 can use an encryption algorithm (e.g., private key or public key encryption) to encrypt the information. In either encryption algorithm, the key is shared with the tracking system, and if desired, shared with only trusted personnel.

The theft detection system 510 can use the received information to monitor and detect grain theft in a number of ways. For example, prior to an onboarding event, the theft detection system 510 receives a weight value of grain, using the short-range data communication module 538, from a communication module of a harvesting machine. Additionally, the theft detection system 510 receives a weight value, using the sensing device 512, onboarded onto the grain cart. Processor 532 can execute instructions stored on the memory 534 to compare and determine the difference between the weight values. If the difference between the weight values is greater than a predetermined threshold, then the controller 530 can generate and transmit a notification, using the satellite data communication module 536, to a tracking system. For example, a notification may include an alarm or alert indicating an unexpected difference (i.e., exceeded predetermined threshold) in grain has been detected, which may correspond to grain theft. Accordingly, the notification may indicate that grain was stolen during the onboarding event.

In another example, the theft detection system 510 receives a weight value of grain, using the sensing device 512, disposed in the grain cart. Subsequent to an offloading event, the theft detection system 510 can obtain a weight value of grain, using the short-range data communication module 538, from a communication module of a trailer. The processor 532 can again execute instructions stored on the memory 534 to compare and determine the difference between the weight values, and if the difference between the weight values is greater than a predetermined threshold, then the controller 530 can generate and transmit a notification, using the satellite data communication module 536, to the tracking system, indicating that grain was stolen during the offloading event.

Further, in some embodiments, the theft detection system 510 uses the short-range data communication module 538 to receive respective weight values of grain provided by the harvesting machine and by the trailer, and determines the difference between the weight values. If the difference between the weight values is greater than a predetermined threshold, then the controller 530 can generate and transmit a notification, using the satellite data communication module 536, to the tracking system. The notification may indicate that grain was stolen during one or more of the onboarding or offloading events, or was stolen while the grain was disposed in the grain cart (independently of the onboarding or offloading events). Accordingly, the theft detection system 510 is designed to monitor and compare the weight values at the multiple, different stages.

In some embodiments, the "predetermined threshold" is based on a predetermined weight difference, such as a value between 50 to 100 pounds (or 22.7 to 45.4 kilograms, respectively). In this regard, the notification is generated and transmitted when the weight difference between two weight values is greater than the predetermined weight difference (i.e., greater than 50 to 100 pounds). Alternatively, in some embodiments, the "predetermined threshold" is based on a percent difference. For example, an initial weight value (e.g., in the harvesting machine prior to the onboarding event, or in the grain cart prior to the offloading event) may be defined as "100%" of the grain, and when a subsequent weight value is (e.g., after the onboarding event into the grain cart, or after the offloading event into the trailer) is a percentage below a predetermined threshold percentage (e.g., 5% to 10% below), then the controller 530 can generate and transmit the notification to the tracking system.

Further, in some embodiments, the theft detection system 510 uses the sensing device 512 to continually monitor a cumulative weight value of grain in a grain bin. As a result, the theft detection system 510 can determine in real-time a weight value of grain in the grain bin during onboarding and offloading events, which can be advantageously used in several ways. For example, during an offloading event, the theft detection system 510 can continually monitor a cumulative weight value of grain in a grain bin, and when the theft detection system 510 does not receive a trailer identity from a trailer onto which the grain is to be offloaded, the theft detection system 510 can transmit a notification to the tracking system. The notification may indicate the grain is being offloaded to an unauthorized trailer or other unauthorized container. Also, the theft detection system 510 can continually monitor a cumulative weight value of grain in a grain bin, and in the absence of any type of onboarding or offloading event, if the cumulative weight of grain in the grain bin decreases, then the theft detection system 510 can transmit a notification to the tracking system. The notification may indicate the grain is being taken from the grain cart without authorization.

In some embodiments, the theft detection system 510 uses the short-range data communication module 538 to receive an expected weight value of grain and then compares the expected weight value with an actual weight value determined by the sensing device 512. For example, prior to an onboarding event, the theft detection system 510 can receive an expected weight value from a harvesting machine indicating a weight value of grain to be onboarded to a grain cart. Then, subsequent to the onboarding event, the theft detection system 510 can determine the actual weight value of grain received from the harvesting machine. The theft detection system 510 can then compare the expected and actual weight values, and provide a notification to the tracking system when the difference between the expected and actual weight values is greater than a predetermined threshold. Similarly, prior to an offloading event, the theft detection system 510 can determine an initial weight value of grain in the grain bin that is to be offloaded to the trailer. Then, subsequent to the offloading event, the theft detection system 510 can receive a final weight value from the trailer indicating a weight value of grain that was offloaded from the grain cart to the trailer. The theft detection system 510 can then compare the initial and final weight values, and provide a notification to the tracking system when the difference the initial and final weight values is greater than a predetermined threshold.

As described, the theft detection system 510 can be used to determine potential grain theft events and generate notifications to the tracking system. However, in some embodiments, the theft detection system 510 is designed to track/record various weight values, track/record various harvester and trailer identities, and transmit this information to the tracking system, thereby allowing the tracking system to determine grain theft events. In other words, the theft detection system 510 can be used without determining potential grain theft events and without generating notifications, and can simply provide information to the tracking system.

Figure 6A:
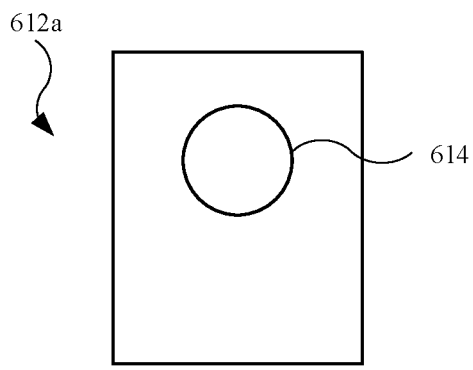
FIGS. 6A-6C show various embodiments of a sensing device.
Figure 6B:
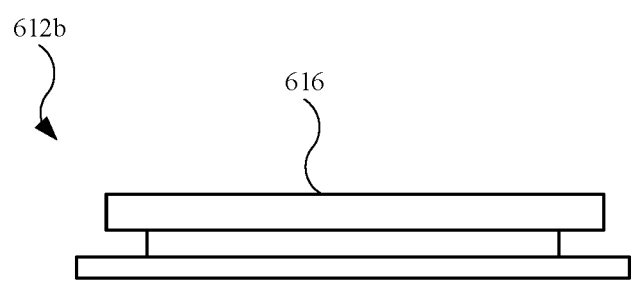
Figure 6C:
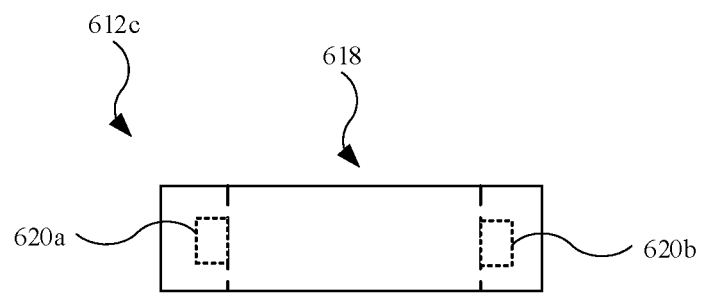

FIGS. 6A-6C show various embodiments of a sensing device. The sensing devices shown and described in FIGS. 6A-6C are exemplary sensing devices that may be placed on the grain cart and communicatively coupled to a theft detection system described herein. FIG. 6A shows a sensing device 612a in the form of an image sensing device. In this manner, the sensing device 612a includes an image detector 614 used to monitor a grain bin, and determine an image of the grain in the grain bin. In some embodiments, the image is converted into a three-dimensional image. Using volume information of the grain bin, the sensing device 612a can determine a weight value of the grain.

FIG. 6B shows a sensing device 612b in the form of a weight management system. In this manner, the sensing device 612b may include a weight sensor or scale used to measure force applied to a platform 616, and convert the measured force into a weight value. In order to measure the force, the sensing device 612b may use features such as a strain gauge, a piezoelectric sensor, or other pressure-sensitive component, as non-limiting examples.

FIG. 6C shows a sensing device 612c in the form of a flow rate sensor. The sensing device 612c may include an opening 618 through which grain passes. The sensing device 612c may further include a transmitter 620a that transmits light and a receiver 620b used to at least partially receive light from the transmitter 620a. As grain passes through the opening, the grain partially blocks the light from the transmitter 620a, and sensing device 612c can determine a flow based upon the amount of light received by the receiver 620b. The flow rate is inversely proportional to light received at the receiver 620b, and accordingly, the flow rate is greater for less light received. The sensing device 612c can determine the weight value based upon the flow rate and additional information, such as density and moisture content.

Figure 7A:
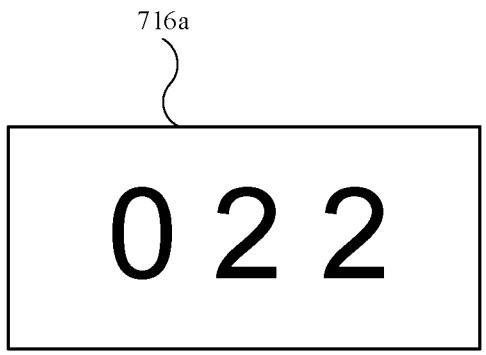
FIGS. 7A-7E show various embodiments of an indicia used to identify machinery.
Figure 7B:
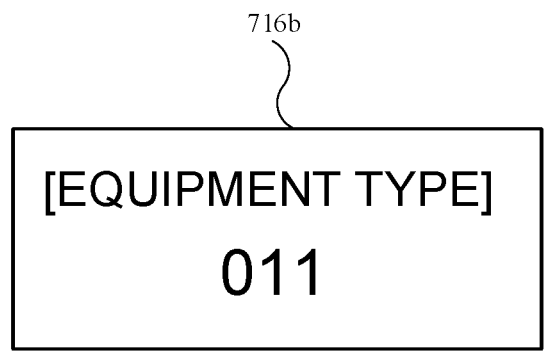
Figure 7C:
Figure 7D:
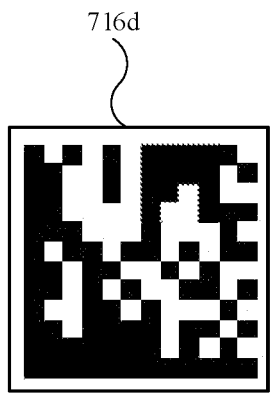
Figure 7E:
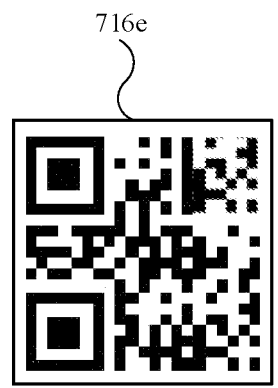

FIGS. 7A-7E show various embodiments of indicia used to identify machinery. The indicia shown and described in FIGS. 7A-7E are exemplary indicia that may be placed on a harvesting machine and/or a trailer in a location visible and readable by a camera system communicatively coupled to a theft detection system described herein. FIG. 7A shows an indicium 716a in the form of a number. The number may be unique to a harvesting machine and/or to a trailer. FIG. 7B shows an indicium 716b in the form of alphanumeric elements. As shown, the indicium 716b may include both letters (forming a word) and numbers used uniquely identify a harvesting machine and/or to a trailer. In some embodiments, the number is removed and the indicium 716b in word form only. FIG. 7C shows an indicium 716c in the form of a one-dimensional bar code. The indicium 716c represents a Universal Product Code ("UPC"). However, it should be noted that several other one-dimensional product codes are possible. FIG. 7D shows an indicium 716d in the form of a two-dimensional bar code. As shown, the indicium 716d includes a data matrix code. FIG. 7E shows an alternate embodiment of an indicium 716e in the form of a two-dimensional bar code. As shown, the indicium 716e includes a quick response ("QR") code. It should be noted that several other two-dimensional product codes are possible.

Figure 8:
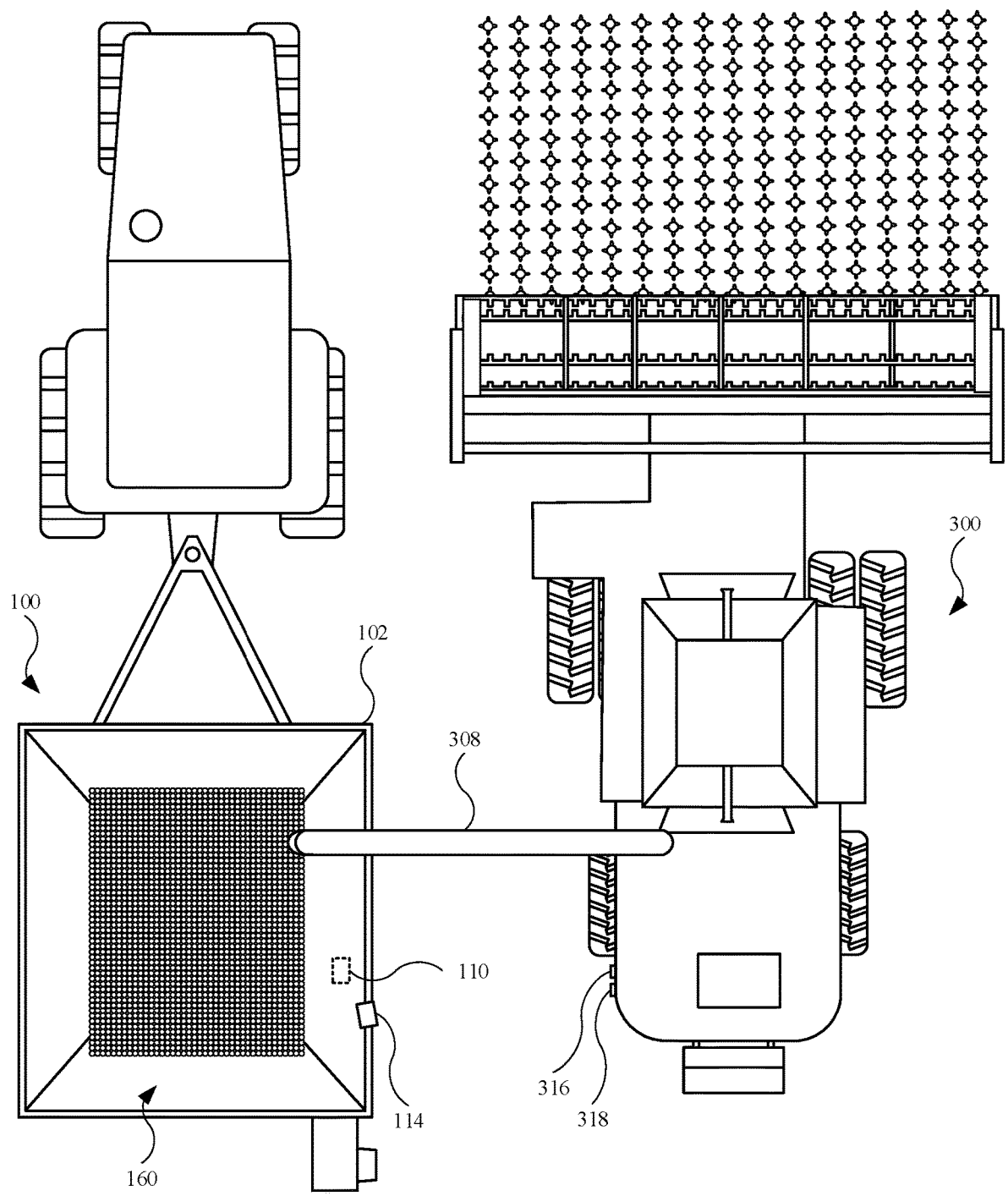
FIG. 8 shows an aerial view of a harvesting machine unloading grain onto a grain cart, in accordance with some described embodiments.

FIG. 8 shows an aerial view of a harvesting machine 300 unloading grain 160 onto a grain cart 100, in accordance with some described embodiments. As shown, the tube 308 of the harvesting machine 300 is extended/deployed and positioned over the grain bin 102, and grain 160 is being onboarded to the grain bin 102 from the harvesting machine 300. The theft detection system 110 can use the sensing device (e.g., sensing device 112 shown in FIG. 1A) to determine a weight value of the grain 160 in the grain bin 102. Additionally, based on the relationship between the grain cart 100 and the harvesting machine 300, the camera system 114 is able to read the indicium 316 located on the harvesting machine 300, and a short-range wireless communication module (e.g., short-range data communication module 538 shown in FIG. 5) is within range to communicate with the communication module 318 of the harvesting machine 300.

Figure 9:
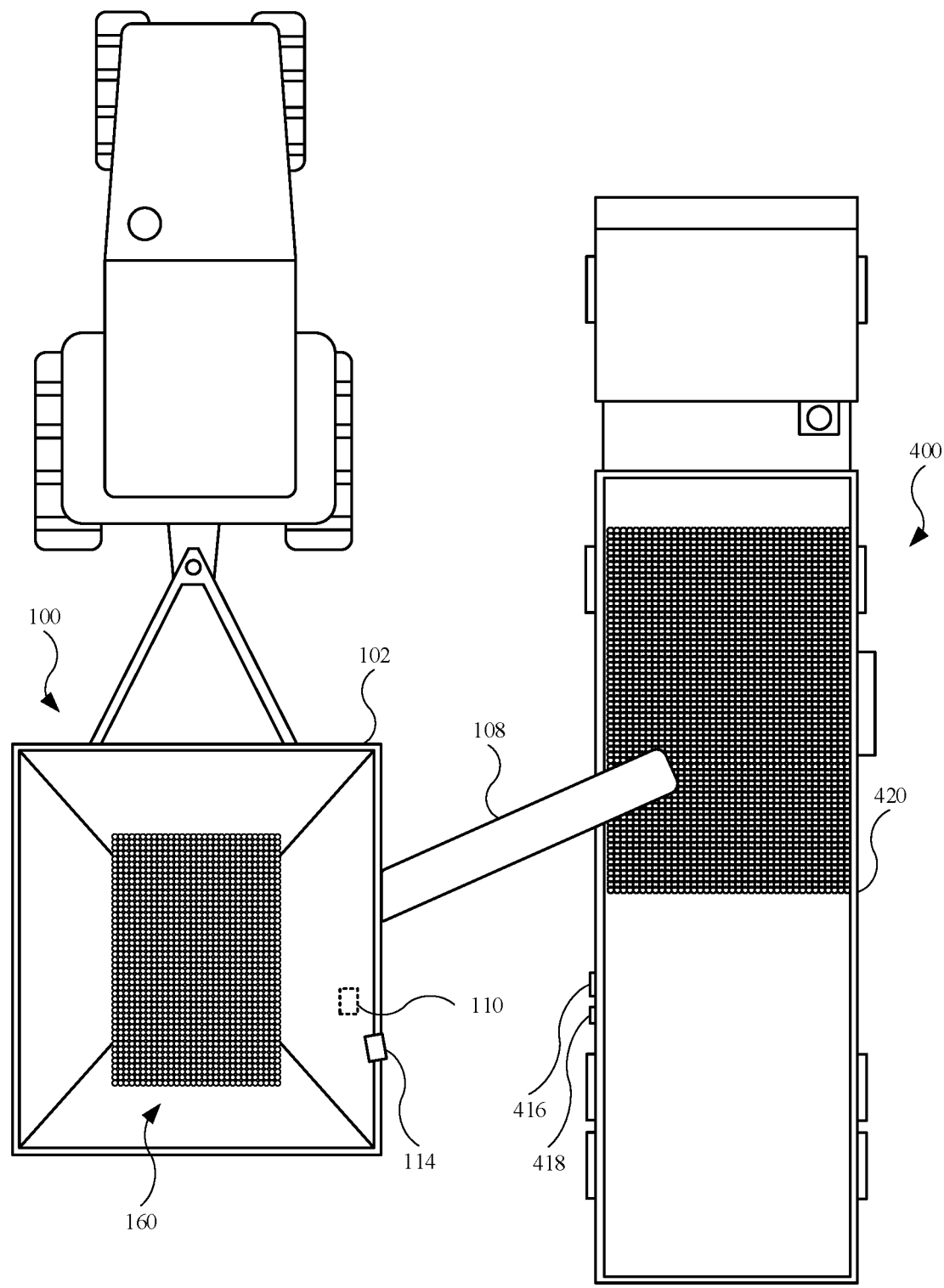
FIG. 9 shows an aerial view of a grain cart unloading grain onto a trailer, in accordance with some described embodiments.

FIG. 9 shows an aerial view of a grain cart 100 unloading grain 160 onto a trailer 400, in accordance with some described embodiments. As shown, the tube 108 of the grain cart 100 is extended/deployed and positioned over the container 420 of the trailer 400, and grain 160 is being offloaded from the grain bin 102 to the container 420. The theft detection system 110 can use the sensing device (e.g., sensing device 112 shown in FIG. 1A) to determine a weight value of the grain 160, including continuously monitoring the weight value during the offloading event. Additionally, based on the relationship between the grain cart 100 and the trailer 400, the camera system 114 is able to read the indicium 416 located on the trailer 400, and a short-range wireless communication module (e.g., short-range data communication module 538 shown in FIG. 5) is within range to communicate with the communication module 418 of the trailer 400.

Figure 10:
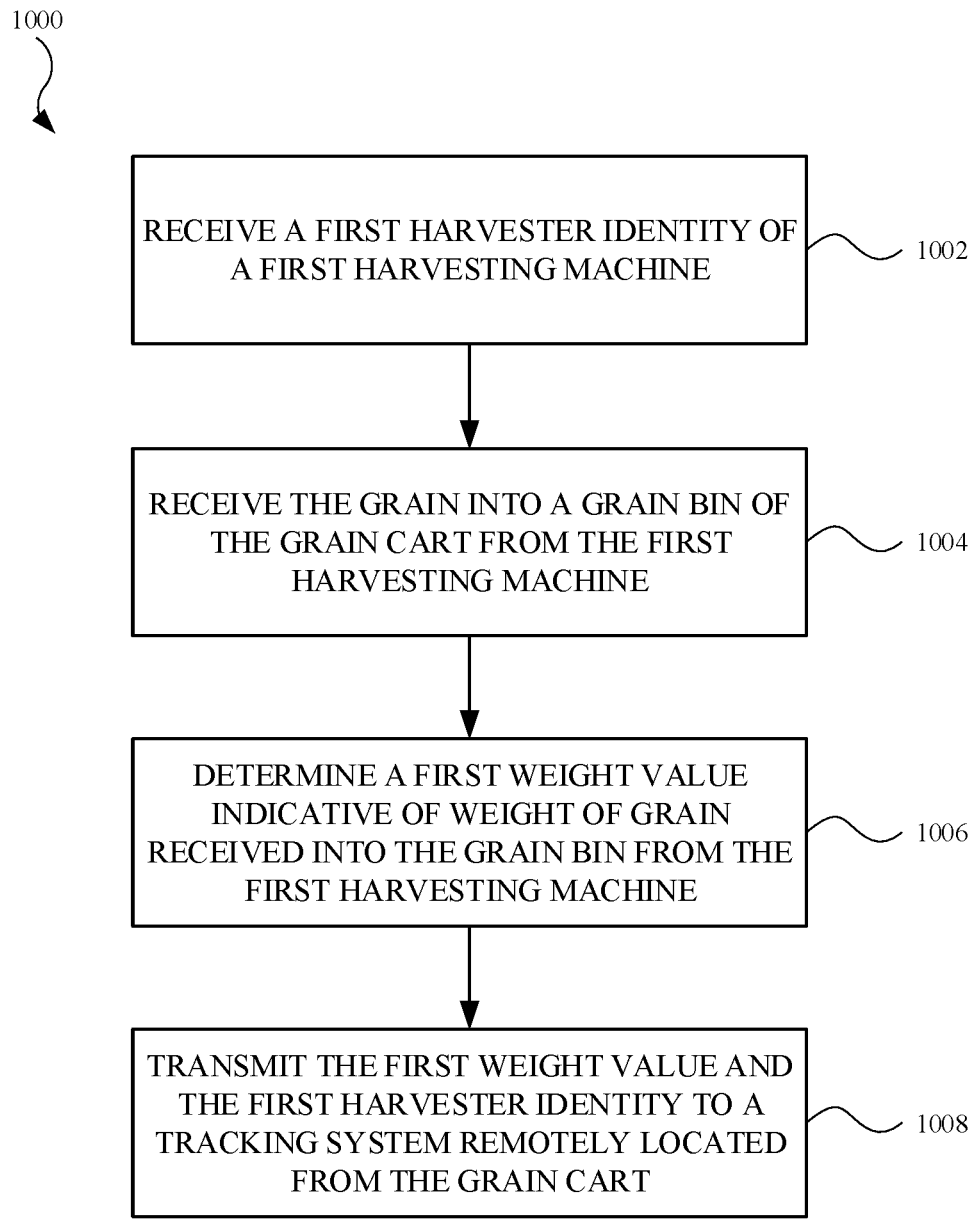
FIG. 10 shows a method for transferring grain in a harvesting operation.

FIG. 10 shows a method 1000 for transferring grain in a harvesting operation, in accordance with some described embodiments. The steps of the method 1000 can be performed by a theft detection system described herein.

In step 1002, a first harvester identity of a first harvesting machine is received. A theft detection system, disposed on a grain cart, can receive the first harvester identity. In some embodiments, the theft detection system includes a short-range wireless communication module used to communicate and received the first harvester identity from a communication module on the first harvesting machine. In some embodiments, the theft detection system uses a camera system (disposed on the grain cart) used to read indicia that identifies the first harvesting machine. As non-limiting examples, the indicia may include a number visible on the first harvesting machine, a bar code (one- or two-dimensional) disposed on the first harvesting machine, and a word visible on the first harvesting machine. Additionally, in some embodiments, the theft detection system can communicate with a mobile device of an operator of the first harvesting machine to determine the first harvester identity.

In step 1004, the grain is received into a grain bin of the grain cart from the first harvesting machine. The first harvesting machine may include a tube and auger used to remove the grain from the first harvesting machine and onboard the grain into the grain bin of the grain cart.

In step 1006, a first weight value indicative of weight of grain received into the grain bin from the first harvesting machine is determined. In order to determine the first weight value, the grain cart may include a sensing device disposed on the grain cart and communicatively coupled to the theft detection system, including a controller of the theft detection system. As non-limiting examples, the sensing device may include an image sensing device, a weight management system, or a flow rate sensor. Using the sensing device, the theft detection system can determine an amount of grain received from the first harvesting machine.

In step 1008, the first weight value and the first harvester identity are transmitted to a tracking system remotely located from the grain cart. The tracking system may take the form of any number of remote systems, such as a remote server (including a cloud-based server), a database, or a computing system. In order to transmit the first weight value and the first harvester identity, the theft detection system may include a satellite data communication module that transmits via satellite data communication protocol. Additionally, in order to prevent persons from obtaining the first weight value and the first harvester identity, the theft detection system may include an encryption module that encrypts data related to the first weight value and the first harvester identity, thereby allowing the satellite data communication module to transmit the data at least partially in an encrypted form.

While the systems and methods described above relate to harvesting operations (e.g., harvesting grain using a harvester, transferring grain from the harvester to a grain cart, transferring grain from the grain cart to a trailer, etc.), the principles of the present disclosure may also be implemented for planting operations and growing operations. In this manner, the principles of the present disclosure may be implemented to prevent, detect, and/or track theft of seed and other materials applied during planting and growing operations as described below in more detail.

For example, planting operations may include, but are not limited to, transferring seed from a trailer or other storage or transportation mechanism to a seed tender (which may, in some examples, correspond to a grain cart or modified grain cart or a dual purpose grain cart/seed tender), transferring seed from the seed tender to a planter/spreader, distributing seed using the planter/spreader, etc.

Similarly, growing operations may include, but are not limited to, transferring granular fertilizer from a trailer or other storage or transportation mechanism to a fertilizer tender (which may, in some examples, correspond to a grain cart or seed tender, a modified grain cart or seed tender, etc.), transferring granular fertilizer from the fertilizer tender to a spreader, distributing granular fertilizer using the spreader, etc.

Other growing operations may include, but are not limited to, transferring liquid fertilizer or other liquids (e.g., liquid pesticides, herbicides, etc., collectively referred to herein, along with liquid fertilizer, as agrochemicals) from a trailer or other storage or transportation mechanism to an agrochemical tender, transferring agrochemicals from the agrochemical tender to a sprayer (e.g., a boom sprayer, a boomless sprayer, a tank sprayer, a tow-behind sprayer or sprayer attachment, etc.) distributing agrochemicals using the sprayer, etc.

While the above example operations include multiple storage and transportation mechanisms, in other examples one or more mechanisms may be omitted while still implementing the principles of the present disclosure. For example, for planting operations, seed may be transferred directly from a trailer or other storage or transportation mechanism to the planter/spreader, manually transferred from bags of seed to the planter/spreader, etc. As one example, principles of the present disclosure as described below may be implemented for pallets, trailers, truck beds, etc. containing bags of granular seed or fertilizer and/or containers of agrochemicals. In some examples, same or similar machinery may be used for two or more of the described harvesting, planting, and growing operations. For example, for final application of seed or agrochemicals, a same agricultural machine or tractor may be used with different types of attachments (e.g., spreaders, sprayers, etc.) for respective operations.

As used in the present disclosure, the terms "equipment" and "machine" may generally refer to any machinery, equipment, etc. described herein, such as a trailer, container, or other storage, seed or fertilizer tender, planter/spreader, sprayer, tractor, tractor attachment, etc.

Further, while generally described below with respect to preventing, detecting, and/or tracking theft of seed and other materials during planting and growing operations, systems and methods of the present disclosure may be implemented for monitoring application and distribution of agricultural materials (seed, granular and/or liquid fertilizer, herbicides, pesticides, etc.) during planting and growing operations. For example, amounts of seed planted by a planter (e.g., seed counts), fertilizer sprayed or distributed (e.g., volume sprayed per acre), etc. can be determined using the principles of the present disclosure.

Figure 11A:
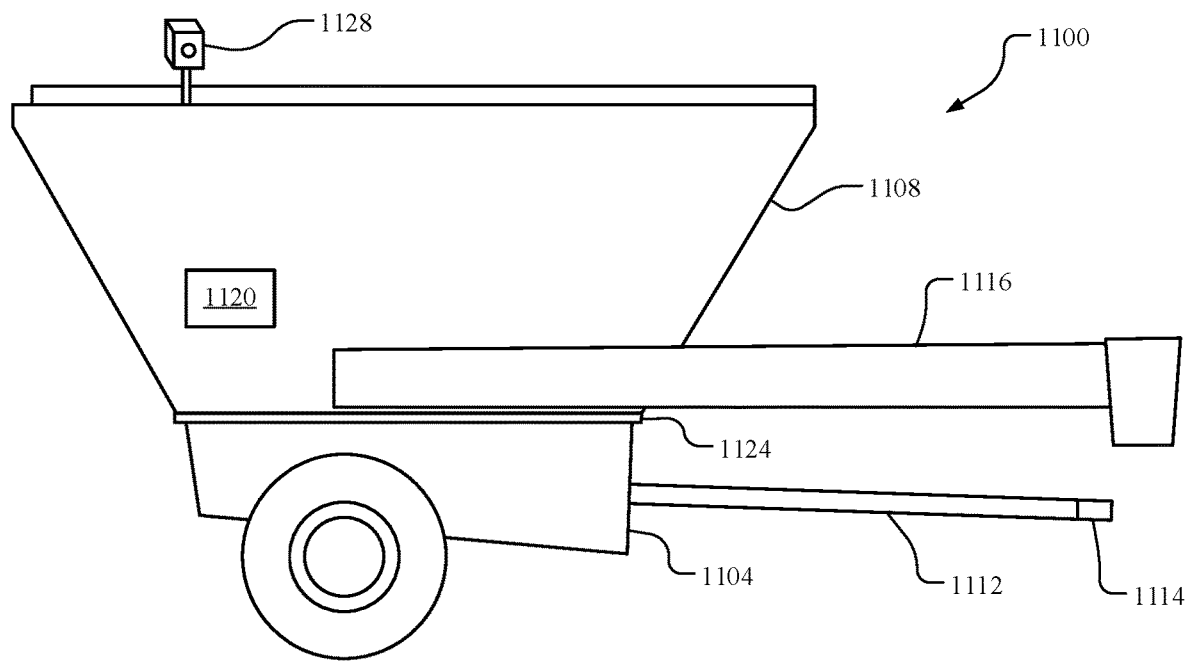
FIGS. 11A and 11B show an example seed tender or cart according to the present disclosure.
Figure 11B:
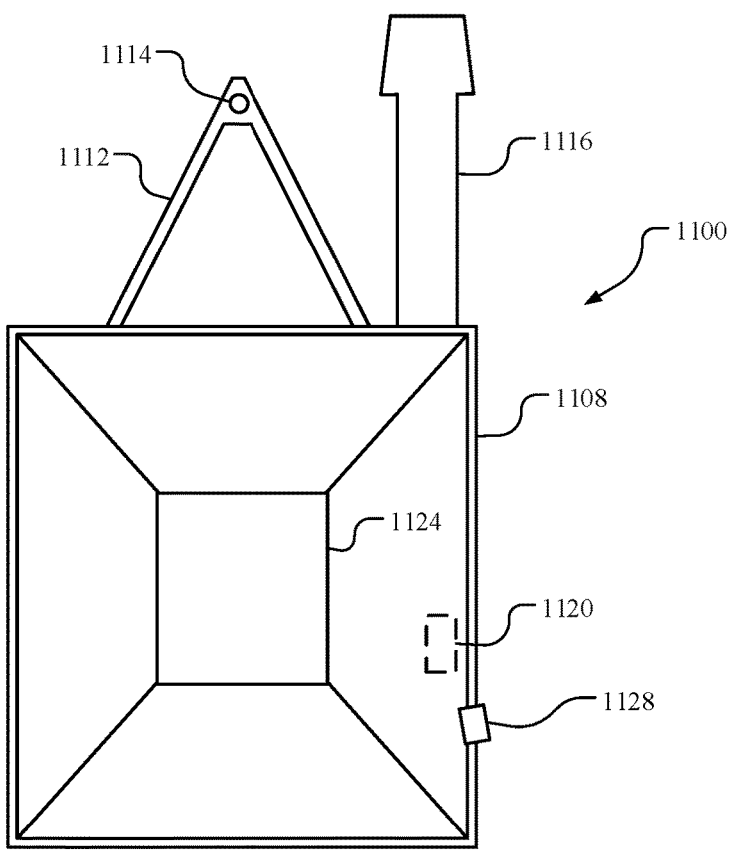

FIGS. 11A and 11B show an example seed tender or cart 1100. While described below as a seed tender, the general operation and structure of a granular fertilizer tender may be similar to the seed tender 100. Accordingly, the principles of the present disclosure as described below with respect to the seed tender 1100 may be implemented with respect to a granular fertilizer tender.

The seed tender 1100 is used to transport and temporarily store seed during a planting operation. As shown, the seed tender 1100 includes a frame 1104 and a seed bin or hopper 1108 positioned on the frame 1104. The seed bin 1108 defines a volume for storing the seed. The seed tender 1100 further includes a tongue or post 1112 and a coupling unit 1114 (located on the post 1112) used to attach to a motorized vehicle (such as the tractor 200 shown in FIG. 2) that pulls the seed tender 1100. Subsequent to receiving seed in the seed bin 1108, the seed tender 1100 is configured to offload the seed into, for example, a seed spreader or planter. In this regard, the seed tender 1100 includes a tube 1116, which may include an auger and/or conveyor mechanism similar to the grain cart 100 described above. While the tube 1116 is shown in a stored position, the tube 1116 can transition to a deployed position to offload seed from the seed bin 1108 to the planter. In some examples, the tube 1116 may be configured to extend/telescope. Although not shown, the seed tender 1100 includes a motor used to rotationally drive the auger and/or conveyor, such as a hydraulic motor driven by hydraulic fluid provided from the motorized vehicle.

In order to monitor seed, the seed tender 1100 includes a theft detection system 1120 (shown schematically). The theft detection system 1120 is designed to track seed, including the weight value or amount, onboarded into the seed bin 1108. The "weight value" may refer to a numerical value associated with the weight measured in pounds or kilograms, as examples. Additionally, the theft detection system 1120 can track seed, including the weight value offloaded from the seed bin 1108 via the tube 1116. While the theft detection system 1120 is shown as mounted to a particular location of the seed bin 1108, the theft detection system 1120 can be mounted to other locations of the seed bin 1108 and the seed tender 1100.

To determine the weight value, the theft detection system 1120 may include a sensing device 1124 in operational relationship with the seed bin 1108. As shown in FIG. 11A, the seed bin 1108 is positioned on the sensing device 1124. When seed is disposed in the seed bin 1108, the sensing device 1124 can determine a weight value the seed bin 1108. By subtracting a known weight value of the seed bin 1108, the sensing device 1124 can determine the weight value of the seed when the seed is loaded into the seed bin 1108. As shown in FIG. 11B, the sensing device 1124 is located in the seed bin 1108. In some embodiments, the sensing device 1124 includes a weight management system, such as a scale.

However, the sensing device 1124 may take other forms as described above in FIGS. 6A-6C.

The theft detection system 1120 may include several communication modules used to receive and transmit information. For example, the theft detection system 1120 may include a satellite data communication module used to transmit information or data associated with the weight value (provided by the sensing device 1124) to a tracking system remotely located with respect to the seed tender 1100. Additionally, the theft detection system 1120 may include a short-range wireless communication module used to send information to, and/or receive information from, other machinery (shown and discussed below) used in the planting operation.

In some embodiments, the seed tender 1100 includes a camera system 1128 used to read identifying indicia from machinery used in the planting operation. Each indicia on the machinery can be specific to that particular machinery. Accordingly, the theft detection system 1120 can determine which machines provide seed to the seed bin 1108 and which machines receive seed from the seed bin 1108. In addition to the weight value, the identified indicia can also be transmitted to the tracking system using the satellite data communication module. Also, prior to transmitting to the tracking system, the theft detection system 1120 may include an encryption module used to encrypt the information or data related to the weight value and the identified indicia.

Figure 12A:
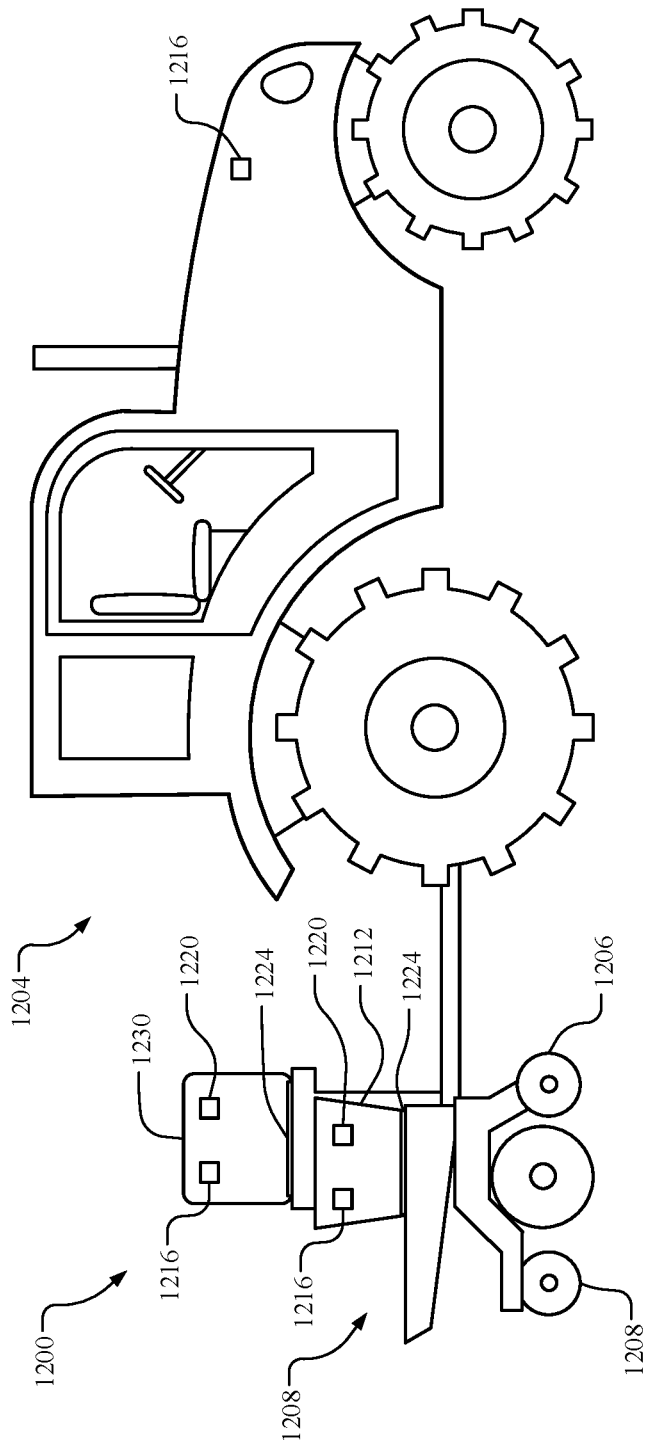
FIGS. 12A and 12B show an example planter according to the present disclosure.
Figure 12B:
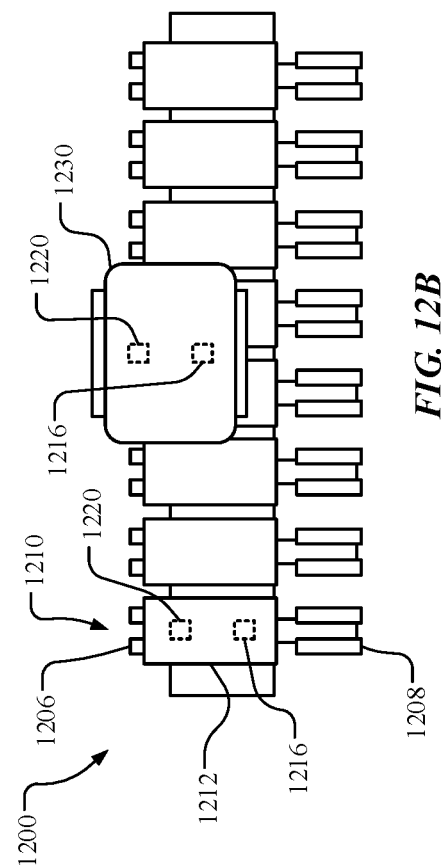

FIGS. 12A and 12B show an example planter 1200. Although shown as a drawn or tow-behind planter (i.e., e.g., a planter attachment configured to be towed behind machinery such as a tractor 1204), the principles of the present disclosure may be implemented with mounted/integrated planters or other type of planters, broadcast spreaders, etc. The planter 1200 is configured to form rows in a planting medium (e.g. to split soil to form a trough using row splitter assemblies 1206), add seeds to the rows, and, in some examples, close the rows subsequent to adding the seeds (e.g., using closing wheel assemblies 1208).

In this example, the planter 1200 includes a plurality of row assemblies 1210. In some examples (as shown), each of the row assemblies 1210 includes a dedicated seed bin 1212. In other examples, one or more of the seed bins 1212 may be shared by one or more of the row assemblies 1210. The seed bins 1212 are configured to store seeds and distribute the seeds through planting mechanisms of the row assemblies 1210 for planting in the rows.

In some examples, the planter 1200 includes one or more indicia 1216 used to identify the planter 1200. In some examples, the planter 1200 includes a plurality of the indicia 1216 (e.g., one for each of the seed bins 1212). The respective indicia 1216 may be the same or different. The indicia 1216 may be unique to the planter 1200 such that the planter 1200 can be distinguished from other planters. In some examples, the tractor 1204 may include one of the indicia 1216 to uniquely identify the tractor 1204, associate the tractor 1204 with the planter 1200, etc. For example, the indicia 1216 may correspond to any of the examples described above in FIGS. 7A-7E.

Referring to the seed tender 1100 in FIGS. 11A and 11B, the camera system 1128 can read indicia (such as the indicia 1216) and provide, to the theft detection system 1120, information related to the indicia. Additionally, in some embodiments, the planter 1200 includes a communication module 1220 (a plurality of communication modules 1220 for respective seed bins 1212) used to receive and/or transmit short-range wireless communication. The theft detection system 1120, also having communication capabilities, can retrieve information from the communication module 1220, such as a weight value of seed in the seed bins 1212, individually and/or collectively (as determined by the planter 1200 prior to an onboarding event, using one or more sensing devices 1224, etc.), authentication information used to verify the planter 1200 (including an expected planter and/or tractor during a harvesting operation), a time stamp associated with initiation of onboarding event, and/or a time duration associated with the time taken for the onboarding event.

Referring again to FIG. 4, the trailer 400 can be used as an onboarding container for onboarding seed to the seed tender 1100. In an example planting operation, the trailer 400 can remain stationary until the seed tender 1100 (e.g., towed by a tractor, such as the tractor 1204) arrives alongside the trailer 400 and the seed can be transferred from the trailer 400 to the seed tender 1100. As described above, the trailer 400 includes the indicium 416 to identify the trailer 400. The camera system 1128 can read the indicium 416 and provide, to the theft detection system 1120, information related to the indicium. The theft detection system 1120, also having communication capabilities, can retrieve information from the communication module 418 of the trailer 400. The retrieved information may include, but is not limited to, a weight value of seed in the container 420 (e.g., a weight value prior to and/or subsequent to transfer of the seed to the trailer 400, transfer of the seed from the trailer 400 to the seed tender 1100, etc.), authentication information used to verify the trailer 400, a time stamp associated with offloading event, and/or a time duration associated with offloading event.

Although described above with respect to granular seed, the principles of the present disclosure may be implemented for application of granular fertilizer (e.g., using the planter 1200 or a broadcast spreader), liquid fertilizer, and/or other agrochemicals. For example, the planter 1200 may include one or more tanks 1230 configured to store and distribute liquids such as liquid fertilizer, herbicides, pesticides, etc. In some examples, the planter 1200 may be configured to apply granular and/or liquid fertilizer at a same time as planting seed. The tank 1230, like the seed bins 1210, may include one of the indicia 1216, the communication module 1220, and/or the sensing devices 1224. In this manner, information associated with storage and transfer of agrochemicals to and from the tank 1230 (e.g., from an agrochemical tender or other type of agrochemical storage or transportation mechanism to the tank 1230) can be tracked by the theft detection system 1120 as described above.

Although described with respect to the planter 1200, the principles of the present disclosure may be implemented with other types of agrochemical application machines, such as dedicated sprayer tow-behind attachments, machines with mounted or integrated sprayer mechanism, etc. In each of these examples, the agrochemical application machines may include one or more tanks configured to store and distribute agrochemicals. Any such tank may include one or more of the indicia 1216, the communication module 1220, the sensing device 1224, etc.

Referring again to FIG. 5, the theft detection system 1120 may be implemented in a same or similar manner as the theft detection system 510 and can be mounted on the seed tender 1100, the planter 1200, the tractor 1204, or any other machinery or equipment associated with planting or growing operations as described above. For example, the sensing device 512 may be configured to determine a weight value of seed in a seed bin of a seed tender or planter, of granular fertilizer in a fertilizer bin, of liquid agrochemicals in a tank of an agrochemical sprayer, etc. For illustration purposes only, operation of the theft detection system 510 with respect to the embodiments described above in FIGS. 11A, 11B, 12A, and 12B will be described in accordance with granular seed.

In this regard, the sensing device 512 can determine a weight value of the seed during transfer events (e.g., either onboarding or offboarding) and provide the weight value information to the controller 530. Accordingly, based on the determined weight value by the sensing device 512, the theft detection system 510 can determine the weight value of the seed to be provided from the trailer to the seed tender and/or from the seed tender to the planter. The satellite data communication module 536 can provide the weight value information of seed, as determined by the sensing device 512, to the tracking system. Additionally, the satellite data communication module 536 can also provide indicia information of associated machinery (e.g., trailer, seed tender, planter, tractor, etc.), as determined by the camera system 514 communicatively coupled to the controller 530.

The short-range data communication module 538 is configured to communicate with the various communication modules to communicate information including, but not limited to, information identifying indicia of the trailer, the seed tender, the planter, and/or the tractor, weight values of seed in respective storage volumes of the trailer, the seed tender, and the planter (e.g., respective seed bins) prior to and subsequent to each transfer event, time stamps associated with initiation of each of the transfer events, and/or time durations associated with each of the transfer events. Alternatively, or in combination, the short-range data communication module 538 can determine identifying information of the various equipment by communicating with mobile devices as described above. The information communicated between the theft detection system 510 and the various equipment may be encrypted to prevent person from gaining knowledge of the weight values of the seed as described herein.

The theft detection system 510 can use the received information to monitor and detect seed theft in a number of ways. For example, prior to a transfer event, the theft detection system 510 receives a weight value of seed, using the short-range data communication module 538, from a communication module of a trailer. Additionally, the theft detection system 510 receives a weight value, using the sensing device 512, onboarded onto the seed tender (or, in some examples, directly to seed bins of a planter). Processor 532 can execute instructions stored on the memory 534 to compare and determine the difference between the weight values. If the difference between the weight values is greater than a predetermined threshold, then the controller 530 may generate and transmit a notification, using the satellite data communication module 536, to a tracking system. For example, a notification may include an alarm or alert indicating an unexpected difference (i.e., exceeded predetermined threshold) in seed has been detected, which may correspond to seed theft. Accordingly, the notification may indicate that seed was stolen during the transfer event.

In another example, the theft detection system 510 receives a weight value of seed, using the sensing device 512, disposed in the seed tender. Subsequent to an offloading event, the theft detection system 510 can obtain a weight value of seed, using the short-range data communication module 538, from a communication module of a planter. The processor 532 can again execute instructions stored on the memory 534 to compare and determine the difference between the weight values, and if the difference between the weight values is greater than a predetermined threshold, then the controller 530 can generate and transmit a notification, using the satellite data communication module 536, to the tracking system, indicating that seed was stolen during the transfer event.

In still other examples, the theft detection system 510 uses the short-range data communication module 538 to receive respective weight values of seed planted by the planter and stored in the seed bins. For example, for a given planting operation, weight values of seed in the seed bins may have an expected rate of decrease. In other words, for a given planting operation for a specific type of seed being planted at a predetermined rate, an expected rate of decrease in the weight value of the seed in the seed bins may be calculated. Accordingly, the weight value of the seed in the seed bins decreasing at a rate greater than the expected rate may indicate that seed was stolen from the seed bins during the actual planting operation. The comparison between the sensed and expected rate of decrease in the weight value of the seed in the bins may be performed continuously, periodically, conditionally, etc.

In some examples, the theft detection system 510 uses the sensing device 512 to continually monitor a cumulative weight value of seed in a seed bin. As a result, the theft detection system 510 can determine in real-time a weight value of seed in the seed bin during onboarding and offloading events, which can be advantageously used in several ways. For example, during an offloading event, the theft detection system 510 can continually monitor a cumulative weight value of seed in a seed bin, and when the theft detection system 510 does not receive a planter or tractor identity from corresponding equipment onto which the seed is to be offloaded, the theft detection system 510 can transmit a notification to the tracking system. The notification may indicate the seed is being offloaded to an unauthorized trailer or other unauthorized container. Also, the theft detection system 510 can continually monitor a cumulative weight value of seed in a seed bin, and in the absence of any type of onboarding or offloading event, if the cumulative weight of seed in the seed bin decreases, then the theft detection system 510 can transmit a notification to the tracking system. The notification may indicate the seed is being taken from the seed cart without authorization.

In some examples, the theft detection system 510 uses the short-range data communication module 538 to receive an expected weight value of seed and then compares the expected weight value with an actual weight value determined by the sensing device 512. For example, prior to a transfer event, the theft detection system 510 can receive an expected weight value from a trailer, seed tender, etc. indicating a weight value of seed to be transferred to seed tender, planter, etc. Then, subsequent to the transfer event, the theft detection system 510 can determine the actual weight value of received seed. The theft detection system 510 can then compare the expected and actual weight values, and provide a notification to the tracking system when the difference between the expected and actual weight values is greater than a predetermined threshold.

As described, the theft detection system 510 can be used to determine potential seed theft events and generate notifications to the tracking system. However, in some embodiments, the theft detection system 510 is designed to track/record various weight values, track/record various trailer, seed tender, planter, and tractor identities, and transmit this information to the tracking system, thereby allowing the tracking system to determine seed theft events. In other words, the theft detection system 510 can be used without determining potential seed theft events and without generating notifications, and can simply provide information to the tracking system.

Further, although described below with respect to weight values, the tracked information may correspond to other indicators of amounts of granular or liquid material stored and transferred. For example, for liquid materials, associated tanks, containers, etc. may include on or more flow sensors configured to sense an amount of liquid stored and transferred between containers and other equipment. Similarly, granular flow sensors may be used to sense an amount of granular material (i.e., seed or granular fertilizer) transferred between containers and other equipment.

In some examples, systems and methods as described herein are further configured to use the tracked information (e.g., tracked weight values, liquid flow, and/or granular flow) to determine an amount of material actually distributed by the equipment. For example, for liquid material, liquid flow sensors implemented by a sprayer other equipment may track an amount of liquid sprayed or otherwise distributed (e.g., by gallon or other unit per acre, hectare, etc.). Similarly, for granular material, granular flow sensors (e.g., seed counters) implemented by a planter other equipment may track an amount of seed planted or otherwise distributed (e.g., by seed count, seeds per acre or hectare, etc.).

In still other examples, tracked weight values for liquid and/or granular material can be used to determine gallons sprayed, seeds planted, etc. For example, for a given material, systems and methods as described herein may be configured (e.g., using stored data) to correlate weights of specific materials to units, such as pounds or kilograms (or other weight measurement) to gallons of respective materials, number of seeds (for different types of seeds), and so on. Accordingly, by tracking weight values and correlating weight values to various types of materials, actual volumes/counts of the different materials can be determined using the weight values.

As one example, a 50-pound bag of wheat may include approximately 50,000 seeds (e.g., 10,000 seeds per pound). Accordingly, if weight values of seed transferred to a planter and distributed by the planter are tracked and the number of seeds per unit of weight is known, the overall amount of seed planted by the planter can be calculated. A volume of liquid material sprayed can be calculated in a similar manner. Accordingly, systems and methods of the present disclosure may be configured to calculate gallons of liquid material sprayed per acre or hectare, seeds per acre or hectare planted, etc.

Alternatively or in addition to the above-described tracking of seed, systems and methods according to the present disclosure may be configured to determine whether seed was planted in an intended/target location. For example, only determining whether a same amount of seed is transferred to and from a seed tender, planted by a planter, etc. does not identify whether the seed was planted in the target location. In other words, the amount of seed planted by the planter may be the same as the amount of seed transferred to and from the seed tender even when the seed was planted at a location other than the target location. Accordingly, the theft detection system 510 according to the present disclosure is further configured to determine whether a location of the planter, the seed tender, and/or other equipment during planting of the seed corresponds to a target location.

For example, information received by the theft detection system 510 from the trailer, seed tender, planter, tractor, etc. may include a current location of the equipment, such as a GPS location determined by a GPS device or module (e.g., one or more GPS devices integrated with or implemented within the theft detection system 1120, the communication modules 1220, etc.). The theft detection system 510 may further store (or otherwise obtain) location information identifying the target location for the seed. For example, the location information may be stored in the memory 534. The location information may be transmitted or input to the theft detection system 510 when the seed is transferred to the trailer, transferred from the trailer to the seed tender, transferred to the planter, etc. In some examples, the location information includes a range of locations and/or a boundary of one or more locations (e.g., geofence information) encompassing one or more target locations (e.g., target planting fields/locations). The location information may be encrypted as described above.

Accordingly, the theft detection system 510 is configured to determine whether a current location of the planter (which may be a location that seed is transferred to the planter, a location that the planter is planting the seed, etc.) corresponds to the target location and selectively generate and/or transmit a notification that seed was (or is currently being) planted in a location other than the target location. For example, the processor 532 can execute instructions stored on the memory 534 to compare the current location to the target location. If the current location does not match the target location (e.g., exactly, within a predetermined distance threshold, etc.) then the controller 530 may generate and transmit a notification, using the satellite data communication module 536, to a tracking system. For example, the controller 530 may determine whether the current location is within a geofenced region corresponding to the target location. For example, a notification may include an alarm or alert indicating that the seed is being transported and/or planted in a location other than the target location, which may correspond to seed theft. Accordingly, the notification may indicate that seed was stolen during a planting operation.

In some examples, the target location may include multiple types of valid/permitted locations for the planter, such as primary locations (e.g., different fields or planting locations) and secondary locations (e.g., a loading location that is not within the planting locations, routes between planting locations, etc.). Accordingly, the target location may include two or more contiguous or non-contiguous locations (e.g. contiguous or non-contiguous geofenced regions). Accordingly, the controller 530 may be configured to refrain from generating the notification based on a determination of whether the planter is outside of a targeted planting location but nonetheless in a location that is not indicative of theft. In these examples, the controller 530 may be configured to instead generate the notification if the planter is in a secondary location for a period greater than a predetermined threshold period. For example, a loading operation may be associated with a first threshold period (e.g., 10 minutes), while traveling a route between different planting locations may be associated with a second threshold period (e.g., a period determined by a calculated amount of time required for the planter to travel/be towed from a first planting location to a second planting location). Accordingly, in some examples, the controller 530 is configured to determine whether the planter is in a secondary location for longer than the predetermined threshold period and generate the notification in response to the determination.

In other examples, the controller 530 may be configured to selectively generate the notification in response to a determination of whether the planter is actually planting seed in a location that does not match the target location. For example, the theft detection system 510 may be further configured to receive (e.g., from the communication modules 1220) an indication of whether the planter is currently planting/dispensing seed. The indication may include an indication of whether the weight of the seed in the seed bins is decreasing, an indication of whether planting mechanisms of the planter are currently operating (e.g., such as signals from sensors indicating that power is being provided to the row assemblies 1210), etc. In these examples, the controller 530 is configured to determine whether the planter is in a location outside of the target location and performing a planting operation and generate the notification in response to the determination.

In these and other examples, the controller 530 may be configured to selectively disable planting in response to a determination that the planter is in a location outside of the target location and performing a planting operation. For example, the controller 530 may be configured to cause the theft detection system 510 to transmit a signal to the planter to disable one or more electrical or mechanical components of the planter (e.g., open or close one or more switches or valves associated with providing hydraulic, mechanical, or electric power to the planter, close valves, doors, etc. configured to allow seed to be distributed from the seed bins, etc.). In other examples, a default status of the planter may be disabled and the controller 530 is configured to cause the planter to transition from the disabled state to an enabled state (e.g., enable switches, valves, doors, etc. to be actuated) only in response to a determination that the planter is in the target location.

In still other examples, the controller 530 may be configured to selectively generate the notification in response to a determination that a current location of the planter was not received (e.g., within an expected period subsequent to transfer of seed to the planter, beginning of planting, etc.). In other words, if the controller 530 is unable to compare the current location of the planter to the target location due to a failure to receive the current location, the controller 530 may selectively generate the notification. For example, the current location may be prevented from being transmitted by the planter and/or received by the theft detection system 510 due to tampering or other interference, loss of signal, damage or other mechanical/electrical faults, etc. Although not all of the causes of failure to receive the current location correspond to theft, the controller 530 may nonetheless generate the notification in response to not receiving the current location within the expected period. In some examples, reception of the current location in a periodic manner (e.g., once per second, once per ten seconds, etc.) corresponds to a "heartbeat" function and the controller 530 is configured to generate the notification in response to termination of the heartbeat function.

In still other examples, the principles of the present disclosure may be implemented for tracking fuel extraction/transfer to/from agricultural machinery, fuel usage/consumption by the agricultural machinery, etc. For example, systems and methods according to the present disclosure may be configured to track weight or volume of fuel extracted from storage vessels, transferred to equipment, and/or used by the equipment. For example, the theft detection system 510 may be configured to determine which equipment used fuel, whether the equipment used the fuel in a target location, etc.

Figure 13:
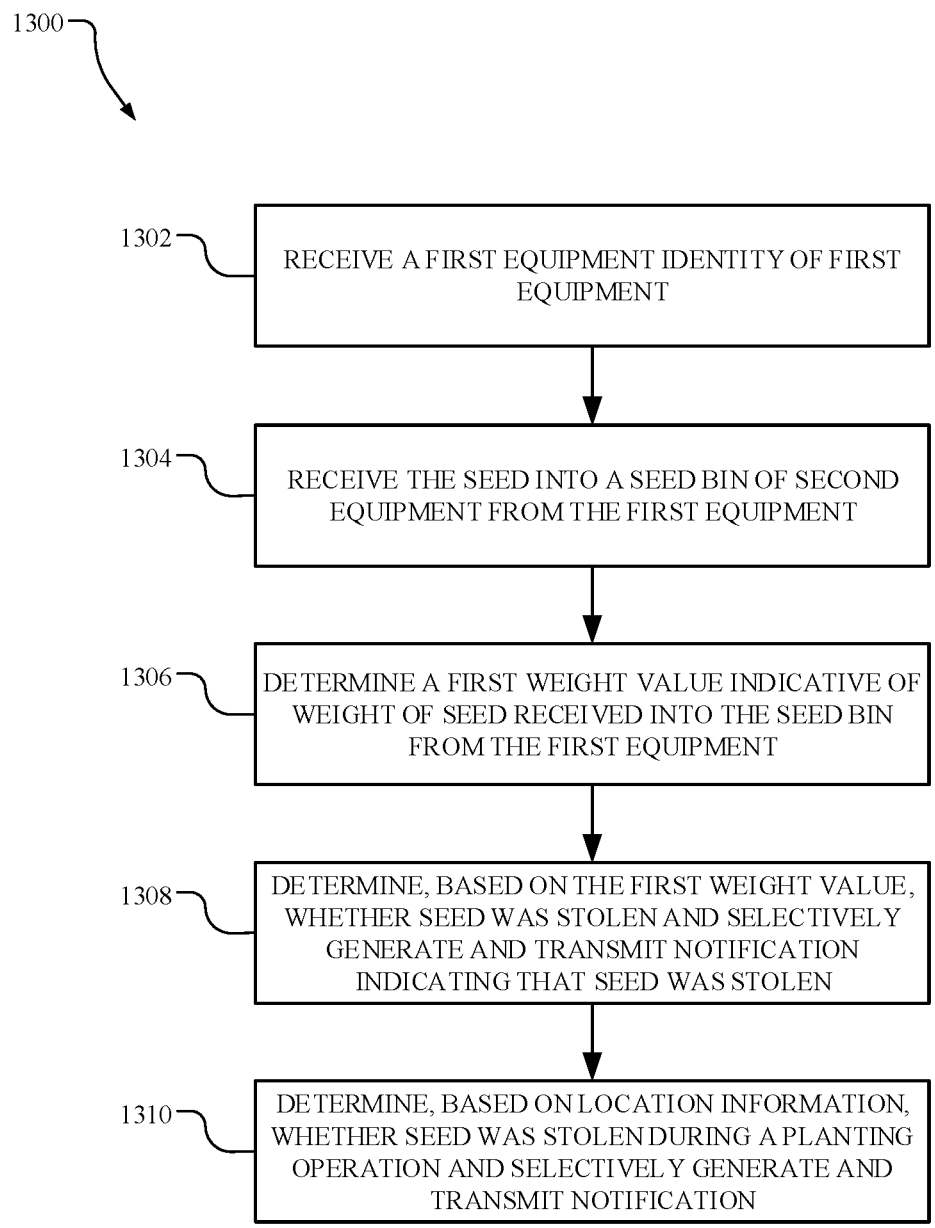
FIG. 13 shows an example method for tracking seed during a planting operation according to the present disclosure.

FIG. 13 shows an example method 1300 for tracking seed during a planting operation according to the principles of the present disclosure. Steps of the method 1300 can be performed by a theft detection system described herein. For example, one or more processors or processing devices, individually or collectively, are configured to execute instructions stored in memory to implement the method 1300, such as one or more processors of the systems descried herein. Although described with respect to tracking seed, the steps of the method 1300 may be implemented in a similar manner for tracking granular or liquid fertilizer, other agrochemicals, fuel, etc. as described above in more detail.

In step 1302, a first equipment identity of first equipment is received. In this example, the first equipment corresponds to equipment containing and/or transporting seed for transfer to second equipment. For example, the first equipment may correspond to a trailer, a seed tender, etc. Accordingly, the second equipment corresponds to equipment configured to receive the seed from the first equipment (e.g., a seed tender configured to receive seed from a trailer, a planter configured to receive seed from a seed tender and/or a trailer, etc.).

A theft detection system (e.g., disposed on the second equipment, third equipment, etc.) can receive the first equipment identity. In some embodiments, the theft detection system includes a short-range wireless communication module used to communicate and receive the first equipment identity from a communication module on the first equipment. In some embodiments, the theft detection system uses a camera system used to read indicia that identifies the first equipment. As non-limiting examples, the indicia may include a number visible on the first equipment, a bar code (one- or two-dimensional) disposed on the first equipment, and a word visible on the first equipment. Additionally, in some embodiments, the theft detection system can communicate with a mobile device of an operator of the first equipment to determine the first equipment.

In step 1304, the seed is received into a seed bin of the second equipment from the first equipment. In step 1306, a first weight value indicative of weight of seed received into the seed bin of the second equipment from the first equipment is determined. In order to determine the first weight value, the second equipment may include a sensing device communicatively coupled to the theft detection system, including a controller of the theft detection system. As non-limiting examples, the sensing device may include an image sensing device, a weight management system, or a flow rate sensor. Using the sensing device, the theft detection system can determine an amount of seed received from the first equipment.

In step 1308, the method 1300 (e.g., the theft detection system) determines, based on the first weight value, the first equipment identity, etc., whether seed was stolen and selectively generates and transmits a notification to a tracking system remotely located from the second equipment. For example, the theft detections system compares the first weight value to a second weight value associated with the first equipment identity. For example, the second weight value may correspond to an amount of seed stored/transported by the first equipment, and amount of seed expected to be delivered/transferred to the second equipment, etc. Accordingly, if the first weight value is less than the second weight value, the method 1300 may determine that seed was stolen.

In other examples, rather than determining whether the seed was stolen using the theft detection system, the theft detection system may instead transmit the first weight value and the first equipment identity to the tracking system. In these examples, the tracking system may determine whether the seed was stolen based on the first weight value, the first equipment identity, etc. as described above.

The tracking system may take the form of any number of remote systems, such as a remote server (including a cloud-based server), a database, a computing system, etc. as described above. In order to transmit the notification, the theft detection system may include a satellite data communication module that transmits via satellite data communication protocol. Additionally, in order to prevent persons from obtaining the first weight value, the first equipment identity, other data contained in the notification, etc., the theft detection system may include an encryption module that encrypts data related to the first weight value and the first equipment identity, thereby allowing the satellite data communication module to transmit data at least partially in an encrypted form.

In step 1310, the method 1300 (e.g., the theft detection system and/or the tracking system) determines, based on location information, whether seed was or is being stolen during a planting operation and selectively generates and transmits a notification accordingly. For example, the theft detection system is configured to determine a current location of the second equipment (e.g., a planter) planting seed, compare the current location to a target location, and determine whether the seed is being planted based on a comparison between the current location and the target location as described above.

Although described with respect to transfer of seed from first equipment to second equipment, the method 1300 may be implemented for transfer between three or more locations, such as from third equipment (e.g., a trailer) to the first equipment (e.g., a seed tender) and from the first equipment to the second equipment (e.g., a planter).

Clause 1.1 A method for transferring seed from first equipment to second equipment during a planting operation comprises: receiving, by a theft detection system, a first equipment identity of the first equipment; receiving the seed into a seed bin of the second equipment from the first equipment; determining, using a sensing device disposed on the second equipment and communicatively coupled to the theft detection system, a first weight value indicative of weight of the seed received into the seed bin from the first equipment; and at least one of transmitting, by the theft detection system using a satellite data communication protocol, the first weight value and the first equipment identity to a tracking system remotely located from the second equipment, and determining, by the theft detection system, whether any of the seed was stolen based on the first weight value and the first equipment identity and selectively generating and transmitting a notification to the tracking system indicating that the seed was stolen.

Clause 2.1 The method of any clause herein, wherein the first equipment is a trailer and the second equipment is a seed tender.

Clause 3.1 The method of any clause herein, wherein the first equipment is a seed tender and the second equipment is a planter.

Clause 4.1 The method of any clause herein, wherein receiving the first equipment identity includes receiving the first equipment identity using a short-range wireless communication protocol.

Clause 5.1 The method of any clause herein, wherein receiving the first equipment identity further comprises reading, using a camera system, identifying indicia of the first equipment.

Clause 6.1 The method of any clause herein, wherein receiving the first equipment identity further comprises receiving, using a short-range wireless communication protocol, the first equipment identity from a portable communication device.

Clause 7.1 The method of any clause herein, further comprising: offloading the seed from third equipment to the first equipment; determining an offload weight value indicative of weight of the seed offloaded from the third equipment to the first equipment; and sending the notification to the tracking system in response to a difference between the offload weight value and the first weight value being greater than a predetermined threshold.

Clause 8.1 The method of any clause herein, further comprising: determining a current location of the second equipment; comparing the current location to a target location; and selectively generating and transmitting the notification to the tracking system based on the comparison between the current location and the target location.

Clause 9.1 The method of any clause herein, further comprising selectively generating and transmitting the notification in response to a determination that the current location is outside of the target location.

Clause 10.1 The method of any clause herein, further comprising selectively generating and transmitting the notification in response to a determination that (i) the current location is outside of the target location and (ii) the second equipment is performing a planting operation.

Clause 11.1 A theft detection system configured to detect theft of seed being transferred from first equipment to second equipment, the theft detection system comprising: a controller configured to determine a first equipment identity of first equipment, determine a first weight value indicative of weight of the seed received, from the first equipment, into a seed bin of the second equipment, and at least one of transmit, using a satellite data communication protocol, the first weight value and the first equipment identity to a tracking system remotely located from the theft detections system, and determine whether any of the seed was stolen based on the first weight value and the first equipment identity and selectively generate and transmit a notification to the tracking system indicating that the seed was stolen.

Clause 12.1 The theft detection system of any clause herein, wherein the first equipment is a trailer and the second equipment is a seed tender.

Clause 13.1 The theft detection system of any clause herein, wherein the first equipment is a seed tender and the second equipment is a planter.

Clause 14.1 The theft detection system of any clause herein, wherein the controller is configured to receive the first equipment identity using a short-range wireless communication protocol.

Clause 15.1 The theft detection system of any clause herein, wherein receiving the first equipment identity further comprises reading, using a camera system, identifying indicia of the first equipment.

Clause 16.1 The theft detection system of any clause herein, wherein the controller is configured to receive the first equipment identity from a portable communication device.

Clause 17.1 The theft detection system of any clause herein, wherein the controller is further configured to: determine an offload weight value indicative of weight of the seed offloaded from third equipment to the first equipment; and send the notification to the tracking system in response to a difference between the offload weight value and the first weight value being greater than a predetermined threshold.

Clause 18.1 The theft detection system of any clause herein, wherein the controller is further configured to: determine a current location of the second equipment; compare the current location to a target location; and selectively generate and transmit the notification to the tracking system based on the comparison between the current location and the target location.

Clause 19.1 The theft detection system of any clause herein, wherein the controller is configured to selectively generate and transmit the notification in response to a determination that the current location is outside of the target location.

Clause 20.1 The theft detection system of any clause herein, wherein the controller is configured to selectively generate and transmit the notification in response to a determination that (i) the current location is outside of the target location and (ii) the second equipment is performing a planting operation.

Clause 21.1 A seed tender comprising the theft detection system of any clause herein.

Clause 22.1 A planter comprising the theft detection system of any clause herein.

Clause 23.1 A method for transferring fuel from first equipment to second equipment during an agricultural operation comprises: receiving, by a theft detection system, a first equipment identity of the first equipment; receiving the fuel into the second equipment from the first equipment; determining, using a sensing device disposed on the second equipment and communicatively coupled to the theft detection system, a first value indicative of an amount of the fuel received into the second equipment from the first equipment; and at least one of transmitting, by the theft detection system using a satellite data communication protocol, the first value and the first equipment identity to a tracking system remotely located from the second equipment, and determining, by the theft detection system, whether any of the fuel was stolen based on the first value and the first equipment identity and selectively generating and transmitting a notification to the tracking system indicating that the fuel was stolen.

Clause 24.1 The method of any clause herein, wherein the first value corresponds to at least one of a weight value, a flow value, and a volume value.

Clause 25.1 A method for transferring agricultural material from first equipment to second equipment during an agricultural operation comprises: receiving, by a theft detection system, a first equipment identity of the first equipment; receiving the agricultural material into the second equipment from the first equipment; determining, using a sensing device disposed on the second equipment and communicatively coupled to the theft detection system, a first value indicative of an amount of the first material received into the second equipment from the first equipment; and at least one of transmitting, by the theft detection system using a satellite data communication protocol, the first value and the first equipment identity to a tracking system remotely located from the second equipment, and determining, by the theft detection system, whether any of the agricultural material was stolen based on the first value and the first equipment identity and selectively generating and transmitting a notification to the tracking system indicating that the fuel was stolen.

Clause 26.1 The method of any clause herein, wherein the first value corresponds to at least one of a weight value, a flow value, a volume value, and a seed count.

Clause 27.1 A method for transferring agricultural material from first equipment to second equipment during an agricultural operation comprises: receiving, by a detection system, a first equipment identity of the first equipment; receiving the agricultural material into the second equipment from the first equipment; determining, using a sensing device disposed on the second equipment and communicatively coupled to the detection system, a first value indicative of an amount of the first material received into the second equipment from the first equipment; and at least one of transmitting, by the detection system using a satellite data communication protocol, the first value and the first equipment identity to a tracking system remotely located from the second equipment, and determining, by the detection system, an amount of the agricultural material that was transferred during the agricultural operation based on the first value and the first equipment identity and selectively generating and transmitting a notification to the tracking system indicating the amount of the agricultural material that was transferred.

Clause 28.1 The method of any clause herein, wherein the first value corresponds to at least one of a weight value, a flow value, a volume value, and a seed count.

Clause 29.1 The method of any clause herein, further comprising, determining, using a second sensing device disposed on the second equipment and communicatively coupled to the detection system, a second value indicative of an amount of the agricultural material distributed from the second equipment.

Clause 30.1 The method of any clause herein, wherein determining the second value includes determining at least one of an amount of seed planted by the second equipment and an amount of liquid agricultural material sprayed by the second equipment.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A method for transferring seed from first equipment to second equipment during a planting operation, the method comprising:
   receiving, by a theft detection system, a first equipment identity of the first equipment;
   receiving the seed into a seed bin of the second equipment from the first equipment;
   determining, using a sensing device disposed on the second equipment and communicatively coupled to the theft detection system, a first weight value indicative of weight of the seed received into the seed bin from the first equipment; and
   at least one of
      transmitting, by the theft detection system using a satellite data communication protocol, the first weight value and the first equipment identity to a tracking system remotely located from the second equipment, and
      determining, by the theft detection system, whether any of the seed was stolen based on the first weight value and the first equipment identity and selectively generating and transmitting a notification to the tracking system indicating that the seed was stolen.

2. The method of claim 1, wherein the first equipment is a trailer and the second equipment is a seed tender.

3. The method of claim 1, wherein the first equipment is a seed tender and the second equipment is a planter.

4. The method of claim 1, wherein receiving the first equipment identity includes receiving the first equipment identity using a short-range wireless communication protocol.

5. The method of claim 1, wherein receiving the first equipment identity further comprises reading, using a camera system, identifying indicia of the first equipment.

6. The method of claim 1, wherein receiving the first equipment identity further comprises receiving, using a short-range wireless communication protocol, the first equipment identity from a portable communication device.

7. The method of claim 1, further comprising:
offloading the seed from third equipment to the first equipment;
determining an offload weight value indicative of weight of the seed offloaded from the third equipment to the first equipment; and
sending the notification to the tracking system in response to a difference between the offload weight value and the first weight value being greater than a predetermined threshold.

8. The method of claim 1, further comprising:
determining a current location of the second equipment;
comparing the current location to a target location; and
selectively generating and transmitting the notification to the tracking system based on the comparison between the current location and the target location.

9. The method of claim 8, further comprising selectively generating and transmitting the notification in response to a determination that the current location is outside of the target location.

10. The method of claim 8, further comprising selectively generating and transmitting the notification in response to a determination that (i) the current location is outside of the target location and (ii) the second equipment is performing a planting operation.

11. A theft detection system configured to detect theft of seed being transferred from first equipment to second equipment, the theft detection system comprising:
a controller configured to
determine a first equipment identity of first equipment,
determine a first weight value indicative of weight of the seed received, from the first equipment, into a seed bin of the second equipment, and
at least one of
transmit, using a satellite data communication protocol, the first weight value and the first equipment identity to a tracking system remotely located from the theft detections system, and
determine whether any of the seed was stolen based on the first weight value and the first equipment identity and selectively generate and transmit a notification to the tracking system indicating that the seed was stolen.

12. The theft detection system of claim 11, wherein the first equipment is a trailer and the second equipment is a seed tender.

13. The theft detection system of claim 11, wherein the first equipment is a seed tender and the second equipment is a planter.

14. The theft detection system of claim 11, wherein the controller is configured to receive the first equipment identity using a short-range wireless communication protocol.

15. The theft detection system of claim 11, wherein receiving the first equipment identity further comprises reading, using a camera system, identifying indicia of the first equipment.

16. The theft detection system of claim 11, wherein the controller is configured to receive the first equipment identity from a portable communication device.

17. The theft detection system of claim 11, wherein the controller is further configured to:
determine an offload weight value indicative of weight of the seed offloaded from third equipment to the first equipment; and
send the notification to the tracking system in response to a difference between the offload weight value and the first weight value being greater than a predetermined threshold.

18. The theft detection system of claim 11, wherein the controller is further configured to:
determine a current location of the second equipment;
compare the current location to a target location; and
selectively generate and transmit the notification to the tracking system based on the comparison between the current location and the target location.

19. The theft detection system of claim 18, wherein the controller is configured to selectively generate and transmit the notification in response to a determination that the current location is outside of the target location.

20. The theft detection system of claim 18, wherein the controller is configured to selectively generate and transmit the notification in response to a determination that (i) the current location is outside of the target location and (ii) the second equipment is performing a planting operation.

21. A seed tender comprising the theft detection system of claim 11.

22. A planter comprising the theft detection system of claim 11.

* * * * *